(12) United States Patent
Moon et al.

(10) Patent No.: US 7,898,735 B2
(45) Date of Patent: *__Mar. 1, 2011__

(54) METHODS AND SYSTEMS FOR WRITING AN OPTICAL CODE WITHIN OR ON A FIBER SUBSTRATE

(75) Inventors: John A. Moon, Wallingford, CT (US); Martin A. Putnam, Cheshire, CT (US); Paul S. Szczepanek, Aptos, CA (US); Tuo Li, East Lyme, CT (US); Anthony Rauseo, Kensington, CT (US); Joseph Traynor, N. Berwick, ME (US)

(73) Assignee: Illumina, Inc., San Diego, CA (US)

( * ) Notice: Subject to any disclaimer, the term of this patent is extended or adjusted under 35 U.S.C. 154(b) by 419 days.

This patent is subject to a terminal disclaimer.

(21) Appl. No.: 12/053,242

(22) Filed: Mar. 21, 2008

(65) Prior Publication Data

US 2008/0165656 A1    Jul. 10, 2008

Related U.S. Application Data

(63) Continuation of application No. 10/661,116, filed on Sep. 12, 2003, now Pat. No. 7,092,160.

(51) Int. Cl.
*G02B 5/18* (2006.01)
(52) U.S. Cl. .................. 359/566; 359/900; 385/37; 385/147
(58) Field of Classification Search .................. None
See application file for complete search history.

(56) References Cited

U.S. PATENT DOCUMENTS

| | | |
|---|---|---|
| 3,074,634 A | 1/1963 | Gamo |
| 3,600,223 A | 8/1971 | Glick |
| 3,614,193 A | 10/1971 | Beiser |
| 3,791,788 A | 2/1974 | Taylor |
| 3,858,979 A | 1/1975 | Elbe |

(Continued)

FOREIGN PATENT DOCUMENTS

CH    598661    5/1978

(Continued)

OTHER PUBLICATIONS

"Introduction to Flow Cytometry: A Learning Guide," BD Biosciences, San Jose, CA, Apr. 2000.

(Continued)

*Primary Examiner*—Arnel C Lavarias
(74) *Attorney, Agent, or Firm*—The Small Patent Law Group; Dean Small; Jason P. Gross

(57) ABSTRACT

A system for writing an optical code within or on a fiber substrate. The system includes a holding device that has a plurality of supports spaced apart from each other. The fiber substrate is wound about the supports such that the fiber substrate forms at least one flat section extending between adjacent supports. The system also includes at least one light source that is configured to write an optical code within or on the flat section of the fiber substrate.

38 Claims, 25 Drawing Sheets

U.S. PATENT DOCUMENTS

| | | |
|---|---|---|
| 3,880,497 A | 4/1975 | Bryngdahl |
| 3,891,302 A | 6/1975 | Dabby et al. |
| 3,903,415 A | 9/1975 | Holzapfel |
| 3,916,182 A | 10/1975 | Dabby et al. |
| 3,928,253 A | 12/1975 | Thornton et al. |
| 3,968,476 A | 7/1976 | McMahon |
| 4,011,435 A | 3/1977 | Phelps |
| 4,023,010 A | 5/1977 | Horst et al. |
| 4,053,228 A | 10/1977 | Schiller |
| 4,053,433 A | 10/1977 | Lee |
| 4,112,037 A | 9/1978 | Parker et al. |
| 4,131,337 A | 12/1978 | Moraw et al. |
| 4,168,146 A | 9/1979 | Grubb et al. |
| 4,301,139 A | 11/1981 | Feingers et al. |
| 4,386,274 A | 5/1983 | Altshuler |
| 4,400,616 A | 8/1983 | Chevillat et al. |
| 4,445,229 A | 4/1984 | Tasto et al. |
| 4,447,546 A | 5/1984 | Hirschfeld |
| 4,537,504 A | 8/1985 | Baltes et al. |
| 4,560,881 A | 12/1985 | Briggs |
| 4,562,157 A | 12/1985 | Lowe et al. |
| 4,647,544 A | 3/1987 | Nicoli et al. |
| 4,678,752 A | 7/1987 | Thorne et al. |
| 4,685,480 A | 8/1987 | Eck |
| 4,688,240 A | 8/1987 | Hosemann |
| 4,690,907 A | 9/1987 | Hibino et al. |
| 4,701,754 A | 10/1987 | Provonchee |
| 4,716,121 A | 12/1987 | Block et al. |
| 4,725,110 A | 2/1988 | Glenn et al. |
| 4,740,468 A | 4/1988 | Weng et al. |
| 4,740,688 A | 4/1988 | Edwards |
| 4,748,110 A | 5/1988 | Paul |
| 4,762,420 A | 8/1988 | Bowley |
| 4,767,719 A | 8/1988 | Finlan |
| 4,770,295 A | 9/1988 | Carveth |
| 4,807,950 A | 2/1989 | Glenn et al. |
| 4,815,027 A | 3/1989 | Tokumitsu |
| 4,816,659 A | 3/1989 | Bianco et al. |
| 4,820,006 A | 4/1989 | Constant |
| 4,822,746 A | 4/1989 | Walt |
| 4,841,140 A | 6/1989 | Sullivan et al. |
| 4,843,631 A | 6/1989 | Steinpichler |
| 4,877,747 A | 10/1989 | Stewart |
| 4,880,752 A | 11/1989 | Keck et al. |
| 4,882,288 A | 11/1989 | North et al. |
| 4,921,805 A | 5/1990 | Gebeyehu et al. |
| 4,931,384 A | 6/1990 | Layton |
| 4,937,048 A | 6/1990 | Sakai et al. |
| 4,958,376 A | 9/1990 | Leib |
| 4,992,385 A | 2/1991 | Godfrey |
| 5,002,867 A | 3/1991 | Macevicz |
| 5,003,600 A | 3/1991 | Deason et al. |
| RE33,581 E | 4/1991 | Nicoli et al. |
| 5,028,545 A | 7/1991 | Soini |
| 5,030,558 A | 7/1991 | Litman et al. |
| 5,033,826 A | 7/1991 | Kolner |
| 5,048,139 A | 9/1991 | Matsumi |
| 5,065,008 A | 11/1991 | Hakamata et al. |
| 5,067,155 A | 11/1991 | Bianco et al. |
| 5,081,012 A | 1/1992 | Flanagan et al. |
| 5,089,387 A | 2/1992 | Tsay et al. |
| 5,090,807 A | 2/1992 | Tai |
| 5,091,636 A | 2/1992 | Takada et al. |
| 5,095,194 A | 3/1992 | Barbanell |
| 5,100,238 A | 3/1992 | Nailor et al. |
| 5,104,209 A | 4/1992 | Hill et al. |
| 5,105,305 A | 4/1992 | Betzig et al. |
| 5,114,864 A | 5/1992 | Walt |
| 5,115,121 A | 5/1992 | Bianco et al. |
| 5,118,608 A | 6/1992 | Layton et al. |
| 5,129,974 A | 7/1992 | Aurenius |
| 5,138,468 A | 8/1992 | Barbanell |
| 5,141,848 A | 8/1992 | Donovan et al. |
| 5,143,853 A | 9/1992 | Walt |
| 5,144,461 A | 9/1992 | Horan |
| 5,160,701 A | 11/1992 | Brown, III et al. |
| 5,166,813 A | 11/1992 | Metz |
| 5,192,980 A | 3/1993 | Dixon et al. |
| 5,196,350 A | 3/1993 | Backman et al. |
| 5,200,794 A | 4/1993 | Nishiguma et al. |
| 5,218,594 A | 6/1993 | Tanno |
| 5,239,178 A | 8/1993 | Derndinger |
| 5,244,636 A | 9/1993 | Walt et al. |
| 5,283,777 A | 2/1994 | Tanno et al. |
| 5,291,006 A | 3/1994 | Nishiguma et al. |
| 5,291,027 A | 3/1994 | Kita et al. |
| 5,300,764 A | 4/1994 | Hoshino et al. |
| 5,307,332 A | 4/1994 | Tinet |
| 5,310,686 A | 5/1994 | Sawyers et al. |
| 5,329,352 A | 7/1994 | Jacobsen |
| 5,342,790 A | 8/1994 | Levine et al. |
| 5,349,442 A | 9/1994 | Deason et al. |
| 5,352,582 A | 10/1994 | Lichtenwalter et al. |
| 5,364,797 A | 11/1994 | Olson et al. |
| 5,367,588 A | 11/1994 | Hill et al. |
| 5,372,783 A | 12/1994 | Lackie |
| 5,374,816 A | 12/1994 | Bianco |
| 5,374,818 A | 12/1994 | Bianco et al. |
| 5,388,173 A | 2/1995 | Glenn |
| 5,394,234 A | 2/1995 | Bianco et al. |
| 5,395,558 A | 3/1995 | Tsai |
| 5,410,147 A | 4/1995 | Riza |
| 5,426,297 A | 6/1995 | Dunphy et al. |
| 5,432,329 A | 7/1995 | O'Boyle et al. |
| 5,442,433 A | 8/1995 | Hoshino et al. |
| 5,448,659 A | 9/1995 | Tsutsui et al. |
| 5,451,528 A | 9/1995 | Raymoure et al. |
| 5,455,178 A | 10/1995 | Fattinger |
| 5,461,475 A | 10/1995 | Lerner et al. |
| 5,465,176 A | 11/1995 | Bianco et al. |
| 5,468,649 A | 11/1995 | Shah et al. |
| 5,472,515 A | 12/1995 | Roberts |
| 5,506,674 A | 4/1996 | Inoue et al. |
| 5,514,785 A | 5/1996 | Van Ness et al. |
| 5,528,045 A | 6/1996 | Hoffman et al. |
| 5,547,849 A | 8/1996 | Baer et al. |
| 5,559,613 A | 9/1996 | Deveaud-Pledran et al. |
| 5,585,639 A | 12/1996 | Dorsel et al. |
| 5,587,832 A | 12/1996 | Krause |
| 5,607,188 A | 3/1997 | Bahns et al. |
| 5,610,287 A | 3/1997 | Nikiforov |
| 5,620,853 A | 4/1997 | Smethers |
| 5,621,515 A | 4/1997 | Hoshino |
| 5,624,850 A | 4/1997 | Kumar et al. |
| 5,625,472 A | 4/1997 | Mizrahi et al. |
| 5,627,040 A | 5/1997 | Bierre et al. |
| 5,627,663 A | 5/1997 | Horan et al. |
| 5,633,724 A | 5/1997 | King et al. |
| 5,633,790 A | 5/1997 | Gritter et al. |
| 5,633,975 A | 5/1997 | Gary et al. |
| 5,667,976 A | 9/1997 | Van Ness et al. |
| 5,671,308 A | 9/1997 | Inoue et al. |
| 5,682,244 A | 10/1997 | Barlow et al. |
| 5,700,037 A | 12/1997 | Keller |
| 5,712,912 A | 1/1998 | Tomko et al. |
| 5,721,435 A | 2/1998 | Troll |
| 5,729,365 A | 3/1998 | Sweatt |
| 5,736,330 A | 4/1998 | Fulton |
| 5,742,432 A | 4/1998 | Bianco |
| 5,745,615 A | 4/1998 | Atkins et al. |
| 5,745,617 A | 4/1998 | Starodubov et al. |
| 5,759,778 A | 6/1998 | Li et al. |
| 5,760,961 A | 6/1998 | Tompkin et al. |
| 5,766,956 A | 6/1998 | Groger et al. |

| Patent | | Date | Inventor |
|---|---|---|---|
| 5,771,251 | A | 6/1998 | Kringlebotn et al. |
| 5,776,694 | A | 7/1998 | Sheiness et al. |
| 5,793,502 | A | 8/1998 | Bianco et al. |
| 5,798,273 | A | 8/1998 | Shuler et al. |
| 5,799,231 | A | 8/1998 | Gates et al. |
| 5,801,857 | A | 9/1998 | Heckenkamp et al. |
| 5,804,384 | A | 9/1998 | Muller et al. |
| 5,812,272 | A | 9/1998 | King et al. |
| 5,824,472 | A | 10/1998 | Betlach et al. |
| 5,824,478 | A | 10/1998 | Muller |
| 5,824,557 | A | 10/1998 | Burke et al. |
| 5,830,622 | A | 11/1998 | Canning et al. |
| 5,831,698 | A | 11/1998 | Depp et al. |
| 5,837,475 | A | 11/1998 | Dorsal et al. |
| 5,837,552 | A | 11/1998 | Cotton |
| 5,841,555 | A | 11/1998 | Bianco et al. |
| 5,846,737 | A | 12/1998 | Kang |
| 5,861,113 | A | 1/1999 | Choquette et al. |
| 5,874,187 | A | 2/1999 | Colvin et al. |
| 5,881,197 | A | 3/1999 | Dong et al. |
| 5,895,750 | A | 4/1999 | Mushahwar et al. |
| 5,922,550 | A | 7/1999 | Everhart et al. |
| 5,922,617 | A | 7/1999 | Wang |
| 5,925,562 | A | 7/1999 | Nova et al. |
| 5,925,878 | A | 7/1999 | Challener |
| 5,945,679 | A | 8/1999 | Dorsel et al. |
| 5,972,542 | A | 10/1999 | Starodubov |
| 5,976,896 | A | 11/1999 | Kumar et al. |
| 5,981,166 | A | 11/1999 | Mandecki |
| 5,986,838 | A | 11/1999 | Thomas, III |
| 5,989,923 | A | 11/1999 | Lowe et al. |
| 5,992,742 | A | 11/1999 | Sullivan |
| 5,998,796 | A | 12/1999 | Liu et al. |
| 6,001,510 | A | 12/1999 | Meng et al. |
| 6,005,691 | A | 12/1999 | Grot et al. |
| 6,017,754 | A | 1/2000 | Chesnut et al. |
| 6,025,129 | A | 2/2000 | Nova et al. |
| 6,025,283 | A | 2/2000 | Roberts |
| 6,027,694 | A | 2/2000 | Boulton et al. |
| 6,030,581 | A | 2/2000 | Virtanen |
| 6,035,082 | A | 3/2000 | Murphy et al. |
| 6,035,083 | A * | 3/2000 | Brennan et al. ............... 385/37 |
| 6,036,807 | A | 3/2000 | Brongers |
| 6,043,880 | A | 3/2000 | Andrews et al. |
| 6,046,925 | A | 4/2000 | Tsien et al. |
| 6,049,727 | A | 4/2000 | Crothall |
| 6,057,107 | A | 5/2000 | Fulton |
| 6,060,256 | A | 5/2000 | Everhart et al. |
| 6,067,167 | A | 5/2000 | Atkinson et al. |
| 6,067,392 | A | 5/2000 | Wakami et al. |
| 6,078,048 | A | 6/2000 | Stevens et al. |
| 6,084,995 | A | 7/2000 | Clements et al. |
| 6,087,186 | A | 7/2000 | Cargill et al. |
| 6,088,503 | A * | 7/2000 | Chandler et al. ............ 385/135 |
| 6,096,496 | A | 8/2000 | Frankel et al. |
| 6,096,596 | A | 8/2000 | Gonzalez |
| 6,097,485 | A | 8/2000 | Lievan |
| 6,103,535 | A | 8/2000 | Pilevar et al. |
| 6,118,127 | A | 9/2000 | Liu et al. |
| 6,128,077 | A | 10/2000 | Jovin et al. |
| 6,137,931 | A | 10/2000 | Ishikawa et al. |
| 6,143,247 | A | 11/2000 | Sheppard, Jr. et al. |
| 6,156,501 | A | 12/2000 | McGall et al. |
| 6,159,748 | A | 12/2000 | Hechinger |
| 6,160,240 | A | 12/2000 | Momma et al. |
| 6,160,656 | A | 12/2000 | Mossberg et al. |
| 6,164,548 | A | 12/2000 | Curiel |
| 6,165,592 | A | 12/2000 | Berger et al. |
| 6,165,648 | A | 12/2000 | Colvin et al. |
| 6,174,648 | B1 | 1/2001 | Terao et al. |
| 6,194,563 | B1 | 2/2001 | Cruickshank |
| 6,204,068 | B1 | 3/2001 | Soini et al. |
| 6,204,969 | B1 | 3/2001 | Jang |
| 6,214,560 | B1 | 4/2001 | Yguerabide et al. |
| 6,218,194 | B1 | 4/2001 | Lyndin et al. |
| 6,221,579 | B1 | 4/2001 | Everhart et al. |
| 6,229,635 | B1 | 5/2001 | Wulf |
| 6,229,827 | B1 | 5/2001 | Fernald et al. |
| 6,229,941 | B1 | 5/2001 | Yoon et al. |
| 6,242,056 | B1 | 6/2001 | Spencer et al. |
| 6,259,450 | B1 | 7/2001 | Chiabrera et al. |
| 6,262,846 | B1 | 7/2001 | Nakai |
| 6,268,128 | B1 | 7/2001 | Collins et al. |
| 6,277,628 | B1 | 8/2001 | Johann et al. |
| 6,284,437 | B1 * | 9/2001 | Kashyap ..................... 430/321 |
| 6,284,459 | B1 | 9/2001 | Nova et al. |
| 6,285,806 | B1 | 9/2001 | Kersey et al. |
| 6,288,220 | B1 | 9/2001 | Kambara et al. |
| 6,292,282 | B1 | 9/2001 | Mossberg et al. |
| 6,292,319 | B1 | 9/2001 | Thomas, III |
| 6,301,047 | B1 | 10/2001 | Hoshino et al. |
| 6,304,263 | B1 | 10/2001 | Chiabrera et al. |
| 6,306,587 | B1 | 10/2001 | Royer et al. |
| 6,309,601 | B1 | 10/2001 | Juncosa et al. |
| 6,312,961 | B1 | 11/2001 | Voirin et al. |
| 6,313,771 | B1 | 11/2001 | Munroe et al. |
| 6,314,220 | B1 | 11/2001 | Mossberg et al. |
| 6,319,668 | B1 | 11/2001 | Nova et al. |
| 6,321,007 | B1 | 11/2001 | Sanders |
| 6,322,932 | B1 | 11/2001 | Colvin et al. |
| RE37,473 | E | 12/2001 | Challener |
| 6,328,209 | B1 | 12/2001 | O'Boyle |
| 6,329,963 | B1 | 12/2001 | Chiabrera et al. |
| 6,331,273 | B1 | 12/2001 | Nova et al. |
| 6,335,824 | B1 | 1/2002 | Overbeck |
| 6,340,588 | B1 | 1/2002 | Nova et al. |
| 6,344,298 | B1 * | 2/2002 | Starodubov et al. ............ 430/5 |
| 6,352,854 | B1 | 3/2002 | Nova et al. |
| 6,355,198 | B1 | 3/2002 | Kim et al. |
| 6,355,432 | B1 | 3/2002 | Fodor et al. |
| 6,356,681 | B1 | 3/2002 | Chen et al. |
| 6,359,734 | B1 | 3/2002 | Staub et al. |
| 6,361,958 | B1 | 3/2002 | Shieh et al. |
| 6,363,097 | B1 | 3/2002 | Linke et al. |
| 6,371,370 | B2 | 4/2002 | Sadler et al. |
| 6,372,428 | B1 | 4/2002 | Nova et al. |
| 6,383,754 | B1 | 5/2002 | Kaufman et al. |
| 6,391,562 | B2 | 5/2002 | Kambara et al. |
| 6,395,558 | B1 | 5/2002 | Duveneck et al. |
| 6,399,295 | B1 | 6/2002 | Kaylor et al. |
| 6,399,935 | B1 | 6/2002 | Jovin et al. |
| 6,403,320 | B1 | 6/2002 | Read et al. |
| 6,406,841 | B1 | 6/2002 | Lee et al. |
| 6,406,848 | B1 | 6/2002 | Bridgham et al. |
| 6,416,714 | B1 | 7/2002 | Nova et al. |
| 6,416,952 | B1 | 7/2002 | Pirrung et al. |
| 6,417,010 | B1 | 7/2002 | Cargill et al. |
| 6,428,707 | B1 | 8/2002 | Berg et al. |
| 6,428,957 | B1 | 8/2002 | Delenstarr |
| 6,429,022 | B1 | 8/2002 | Kunz et al. |
| 6,433,849 | B1 | 8/2002 | Lowe |
| 6,436,651 | B1 | 8/2002 | Everhart et al. |
| 6,440,667 | B1 | 8/2002 | Fodor et al. |
| 6,456,762 | B1 | 9/2002 | Nishiki et al. |
| RE37,891 | E | 10/2002 | Collins et al. |
| 6,462,770 | B1 | 10/2002 | Cline et al. |
| 6,489,606 | B1 | 12/2002 | Kersey et al. |
| 6,496,287 | B1 | 12/2002 | Seiberle et al. |
| 6,506,342 | B1 | 1/2003 | Frankel |
| 6,514,767 | B1 | 2/2003 | Natan |
| 6,515,753 | B2 | 2/2003 | Maher et al. |
| 6,522,406 | B1 | 2/2003 | Rovira et al. |
| 6,524,793 | B1 | 2/2003 | Chandler et al. |
| 6,533,183 | B2 | 3/2003 | Aasmul et al. |
| 6,542,673 | B1 | 4/2003 | Holter et al. |
| 6,544,739 | B1 | 4/2003 | Fodor et al. |

| | | | | | |
|---|---|---|---|---|---|
| 6,545,758 B1 | 4/2003 | Sandstrom | 2002/0039728 A1 | 4/2002 | Kain |
| 6,552,809 B1 | 4/2003 | Bergeron | 2002/0039732 A1 | 4/2002 | Bruchez et al. |
| 6,560,017 B1 | 5/2003 | Bianco | 2002/0074513 A1 | 6/2002 | Abel et al. |
| 6,565,770 B1 | 5/2003 | Mayer et al. | 2002/0084329 A1 | 7/2002 | Kaye |
| 6,573,523 B1 | 6/2003 | Long | 2002/0090650 A1 | 7/2002 | Empedocles et al. |
| 6,576,424 B2 | 6/2003 | Fodor et al. | 2002/0094528 A1 | 7/2002 | Salafsky |
| 6,578,712 B2 | 6/2003 | Lawandy | 2002/0097658 A1 | 7/2002 | Worthington |
| 6,592,036 B2 | 7/2003 | Sadler et al. | 2002/0155490 A1 | 10/2002 | Skinner et al. |
| 6,594,421 B1 | 7/2003 | Johnson et al. | 2002/0174918 A1 | 11/2002 | Fujimura et al. |
| 6,609,728 B1 | 8/2003 | Voerman et al. | 2002/0197456 A1 | 12/2002 | Pope |
| 6,613,581 B1 | 9/2003 | Wada et al. | 2003/0008323 A1 | 1/2003 | Ravkin et al. |
| 6,618,342 B1 | 9/2003 | Johnson et al. | 2003/0021003 A1 | 1/2003 | Ono et al. |
| 6,622,916 B1 | 9/2003 | Bianco | 2003/0032203 A1 | 2/2003 | Sabatini et al. |
| 6,628,439 B2 | 9/2003 | Shiozawa et al. | 2003/0077038 A1 | 4/2003 | Murashima et al. |
| 6,632,655 B1 | 10/2003 | Mehta et al. | 2003/0082568 A1 | 5/2003 | Phan et al. |
| 6,635,470 B1 | 10/2003 | Vann | 2003/0082587 A1 | 5/2003 | Seul et al. |
| 6,635,863 B1 | 10/2003 | Nihommori et al. | 2003/0129654 A1 | 7/2003 | Ravkin et al. |
| 6,646,243 B2 | 11/2003 | Pirrung et al. | 2003/0138208 A1 | 7/2003 | Pawlak et al. |
| 6,657,758 B1 | 12/2003 | Garner | 2003/0142704 A1 | 7/2003 | Lawandy |
| 6,660,147 B1 | 12/2003 | Woudenberg et al. | 2003/0142713 A1 | 7/2003 | Lawandy |
| 6,678,429 B2 | 1/2004 | Mossberg et al. | 2003/0153006 A1 | 8/2003 | Washizu |
| RE38,430 E | 2/2004 | Rosenstein | 2003/0162296 A1 | 8/2003 | Lawandy |
| 6,689,316 B1 | 2/2004 | Blyth et al. | 2003/0184730 A1 | 10/2003 | Price |
| 6,692,031 B2 | 2/2004 | McGrew | 2003/0203390 A1 | 10/2003 | Kaye |
| 6,692,912 B1 | 2/2004 | Boles et al. | 2003/0228610 A1 | 12/2003 | Seul |
| 6,708,618 B1 | 3/2004 | Tsai | 2004/0027968 A1 | 2/2004 | Horimai |
| 6,750,941 B2 | 6/2004 | Satoh et al. | 2004/0047030 A1 | 3/2004 | MacAulay |
| 6,794,658 B2 | 9/2004 | MacAulay | 2004/0062178 A1 | 4/2004 | Horimai |
| 6,806,954 B2 | 10/2004 | Sandstrom | 2004/0075907 A1 | 4/2004 | Moon et al. |
| 6,858,184 B2 | 2/2005 | Pelrine | 2004/0100636 A1 | 5/2004 | Somekh et al. |
| 6,874,639 B2 | 4/2005 | Lawandy | 2004/0100892 A1 | 5/2004 | Horimai |
| 6,881,789 B2 | 4/2005 | Bosse | 2004/0125370 A1 | 7/2004 | Montagu |
| 6,892,001 B2 | 5/2005 | Ohta et al. | 2004/0125424 A1 | 7/2004 | Moon |
| 6,905,885 B2 | 6/2005 | Colston et al. | 2004/0126875 A1 | 7/2004 | Putnam |
| 6,908,737 B2 | 6/2005 | Ravkin et al. | 2004/0132205 A1 | 7/2004 | Moon et al. |
| 6,919,009 B2 | 7/2005 | Stonas | 2004/0156471 A1 | 8/2004 | Sakata |
| 6,972,883 B2 | 12/2005 | Fujii et al. | 2004/0170356 A1 | 9/2004 | Iazikov et al. |
| 6,982,996 B1 | 1/2006 | Putnam et al. | 2004/0175842 A1 | 9/2004 | Roitman |
| 7,014,815 B1 | 3/2006 | Worthington et al. | 2004/0209376 A1 | 10/2004 | Natan et al. |
| 7,045,049 B1 | 5/2006 | Natan | 2004/0233485 A1 | 11/2004 | Moon |
| 7,065,032 B2 | 6/2006 | Horimai | 2004/0263923 A1 | 12/2004 | Moon et al. |
| 7,080,857 B2 | 7/2006 | Patton | 2005/0042764 A1 | 2/2005 | Sailor et al. |
| 7,092,160 B2 * | 8/2006 | Putnam et al. ............... 359/566 | 2005/0056587 A1 | 3/2005 | Allen |
| 7,106,513 B2 | 9/2006 | Moon et al. | 2005/0220408 A1 | 10/2005 | Putnam |
| 7,122,384 B2 | 10/2006 | Prober | 2005/0227252 A1 | 10/2005 | Moon et al. |
| 7,126,755 B2 | 10/2006 | Moon et al. | 2005/0270603 A1 | 12/2005 | Putnam et al. |
| 7,164,533 B2 | 1/2007 | Moon | 2006/0023310 A1 | 2/2006 | Putnam et al. |
| 7,190,522 B2 | 3/2007 | Moon | 2006/0028727 A1 | 2/2006 | Moon et al. |
| 7,215,628 B2 | 5/2007 | Horimai | 2006/0050544 A1 | 3/2006 | Horimai |
| 7,225,082 B1 | 5/2007 | Natan | 2006/0057729 A1 | 3/2006 | Moon et al. |
| 7,321,541 B2 | 1/2008 | Horimai | 2006/0063271 A1 | 3/2006 | Putnam et al. |
| 7,339,148 B2 | 3/2008 | Kawano | 2006/0067179 A1 | 3/2006 | Matsumoto |
| 7,349,158 B2 | 3/2008 | Moon | 2006/0071075 A1 | 4/2006 | Moon et al. |
| 7,375,890 B2 * | 5/2008 | Putnam et al. ............... 359/566 | 2006/0072177 A1 | 4/2006 | Putnam et al. |
| 7,399,643 B2 | 7/2008 | Moon et al. | 2006/0118630 A1 | 6/2006 | Kersey et al. |
| 7,433,123 B2 | 10/2008 | Putnam et al. | 2006/0119913 A1 | 6/2006 | Moon |
| 7,441,703 B2 | 10/2008 | Moon | 2006/0132877 A1 | 6/2006 | Kersey |
| 7,508,608 B2 | 3/2009 | Kersey | 2006/0134324 A1 | 6/2006 | Putnam et al. |
| 7,602,952 B2 | 10/2009 | Kersey | 2006/0139635 A1 | 6/2006 | Kersey et al. |
| 7,604,173 B2 | 10/2009 | Kersey | 2006/0140074 A1 | 6/2006 | Horimai |
| 7,619,819 B2 | 11/2009 | Moon | 2006/0160208 A1 | 7/2006 | Putnam et al. |
| 7,791,802 B2 | 9/2010 | Putnam et al. | 2007/0121181 A1 | 5/2007 | Moon et al. |
| 7,796,333 B2 | 9/2010 | Kersey et al. | 2007/0236789 A1 | 10/2007 | Moon |
| 2001/0007775 A1 | 7/2001 | Seul et al. | 2008/0085565 A1 | 4/2008 | Moon |
| 2001/0020375 A1 | 9/2001 | Novak et al. | 2008/0129990 A1 | 6/2008 | Moon |
| 2001/0029049 A1 | 10/2001 | Walt | 2008/0165656 A1 | 7/2008 | Moon et al. |
| 2002/0000471 A1 | 1/2002 | Aasmul et al. | 2008/0170664 A1 | 7/2008 | Kalman |
| 2002/0006664 A1 | 1/2002 | Sabatini | 2008/0192311 A1 | 8/2008 | Horimai |
| 2002/0018430 A1 | 2/2002 | Heckenkamp et al. | 2009/0034078 A1 | 2/2009 | Putnam |
| 2002/0022273 A1 | 2/2002 | Empedocles et al. | 2009/0040885 A1 | 2/2009 | Horimai |
| 2002/0025534 A1 | 2/2002 | Goh et al. | 2009/0073520 A1 | 3/2009 | Kersey |
| 2002/0031783 A1 | 3/2002 | Empedocles et al. | 2009/0194589 A1 | 8/2009 | Moon et al. |
| 2002/0034747 A1 | 3/2002 | Bruchez et al. | 2010/0025482 A1 | 2/2010 | Moon |

| | | | |
|---|---|---|---|
| 2010/0072278 A1 | 3/2010 | Putnam | |
| 2010/0099574 A1 | 4/2010 | Moon | |

FOREIGN PATENT DOCUMENTS

| | | |
|---|---|---|
| CH | 598661 A | 5/1978 |
| DE | 2416652 | 10/1975 |
| EP | 0 395 300 | 10/1990 |
| EP | 0 723 149 | 7/1996 |
| EP | 0 798 573 A1 | 10/1997 |
| EP | 0 911 667 A1 | 4/1999 |
| EP | 0 916 981 | 5/1999 |
| EP | 916981 | 5/1999 |
| EP | 0 972 817 A1 | 1/2000 |
| EP | 1 182 054 A2 | 2/2002 |
| EP | 1182054 | 2/2002 |
| EP | 1219979 | 7/2002 |
| GB | 2 118 189 | 10/1983 |
| GB | 2 129 551 | 5/1984 |
| GB | 2129551 | 5/1984 |
| GB | 2 138 821 | 10/1984 |
| GB | 2 299 235 | 9/1996 |
| GB | 2 306 484 | 5/1997 |
| GB | 2 319 838 | 6/1998 |
| GB | 2372100 | 8/2002 |
| JP | 58143254 | 8/1983 |
| JP | 01047950 | 2/1989 |
| JP | 05307119 | 11/1993 |
| JP | 06333102 | 2/1994 |
| JP | 08102544 | 4/1996 |
| JP | 08272923 | 10/1996 |
| JP | 10160705 | 6/1998 |
| JP | 11119029 | 4/1999 |
| JP | 2000-035521 | 2/2000 |
| JP | 20035521 | 2/2000 |
| JP | 2000249706 | 9/2000 |
| JP | 2002513166 | 5/2002 |
| JP | 2002182022 A | 6/2002 |
| JP | 2003004671 | 8/2003 |
| WO | WO 91/06496 | 5/1991 |
| WO | WO 93/09668 | 5/1993 |
| WO | WO 94/28119 | 12/1994 |
| WO | WO 96/24061 | 8/1996 |
| WO | WO 96/36436 A1 | 11/1996 |
| WO | WO9636436 | 11/1996 |
| WO | WO 97/12680 | 4/1997 |
| WO | WO 97/15690 | 5/1997 |
| WO | WO 97/17258 | 5/1997 |
| WO | WO 97/31282 | 8/1997 |
| WO | WO 97/34171 | 9/1997 |
| WO | WO 98/04740 | 2/1998 |
| WO | WO 98/24549 | 6/1998 |
| WO | WO 99/02266 | 1/1999 |
| WO | WO 99/09042 | 2/1999 |
| WO | WO 99/32654 | 7/1999 |
| WO | WO 99/42209 | 8/1999 |
| WO | WO 00/08443 | 2/2000 |
| WO | WO 00/16893 A2 | 3/2000 |
| WO | WO0016893 | 3/2000 |
| WO | WO 00/19262 | 6/2000 |
| WO | WO 00/37914 | 6/2000 |
| WO | WO 00/37969 | 6/2000 |
| WO | WO 00/39617 | 7/2000 |
| WO | WO 00/61198 | 10/2000 |
| WO | WO 00/63419 | 10/2000 |
| WO | WO0061198 | 10/2000 |
| WO | WO 01/58583 A1 | 8/2001 |
| WO | WO0158583 | 8/2001 |
| WO | WO 01/71322 A2 | 9/2001 |
| WO | WO0171322 | 9/2001 |
| WO | WO 01/78889 A2 | 10/2001 |
| WO | WO0178889 | 10/2001 |
| WO | WO 01/90225 | 11/2001 |
| WO | WO 02/059306 A2 | 8/2002 |
| WO | WO 02/059603 | 8/2002 |
| WO | WO02059306 | 8/2002 |
| WO | WO 02064829 | 8/2002 |
| WO | WO 03/061983 | 7/2003 |
| WO | WO03061983 | 7/2003 |
| WO | WO 03 091731 | 11/2003 |
| WO | WO 2004011940 | 2/2004 |
| WO | WO 2004015418 | 2/2004 |
| WO | WO 2004/019276 A1 | 3/2004 |
| WO | WO 2004/024328 | 3/2004 |
| WO | WO 2004/025561 | 3/2004 |
| WO | WO 2004/025562 | 3/2004 |
| WO | WO 2004/025563 A1 | 3/2004 |
| WO | WO2004019276 | 3/2004 |
| WO | WO2004024328 | 3/2004 |
| WO | WO2004025562 | 3/2004 |
| WO | WO 2004/034012 | 4/2004 |
| WO | WO 2004046697 | 6/2004 |
| WO | WO 2004/066210 | 8/2004 |
| WO | WO2004066210 | 8/2004 |
| WO | WO 2005/026729 A3 | 3/2005 |
| WO | WO 2005/027031 A2 | 3/2005 |
| WO | WO 2005/029047 A2 | 3/2005 |
| WO | WO 2005/033681 A1 | 4/2005 |
| WO | WO 2005/050207 A3 | 6/2005 |
| WO | WO 2005/079544 A2 | 9/2005 |
| WO | WO 2006/020363 A2 | 2/2006 |
| WO | WO 2006/055735 A2 | 5/2006 |
| WO | WO 2006/055736 A1 | 5/2006 |
| WO | WO 2006/076053 A1 | 7/2006 |

OTHER PUBLICATIONS

Burstein Technology, Inc.; "Angel Strategies Tombstone"; 1 pg.
Vander Lugt; "Design Relationships for Holographic Memories"; Applied Optics, vol. 12, No. 7, Jul. 1973; pp. 1675-1685.
Andrew Marshall; "DNA Chips: Array of Possibilities"; Nature Biotechnology vol. 16 Jan. 1998; pp. 27-31.
Thomas Laurell; "Enhanced Enzyme Activity in Silicon Integrated Enzyme Reactors Utilizing Porous Silicon as the Coupling Matrix"; Sensor & Actuators B 31 (1996); pp. 161-166.
Michael J. Kozal; "Extensive Polymorphisms Observed in HIV-1 Clade B Protease Gene Using High-Density Oligonucleotide Arrays"; Nature Medicine, vol. 2, No. 7, Jul. 1996; pp. 753-759.
Masato Mitsuhashi; "Gene Manipulation on Plastic Plates"; Nature, vol. 357, Jun. 11, 1992; pp. 519-520.
"Ben Beune Patent Licensing Director of Philips IP&S"; Replication & Duplication -News&Technology; Jan.-Feb. 2002; pp. 1-2.
"Compact Disc Arrayer"; V&P Scientific; Nov. 17, 2003; pp. 1-4.
De Beer et al., "Forward-Scattering Degenerate Four-Wave Mixing for Sensitive Absorption Detection in Microseparation Systems Coupling to Micro-Column Liquid Chromatography"; Journal of Chromatography A. 811 (1998); pp. 35-45.
Fonjallaz et al., "Interferometric Side Diffraction Technique for the Characterisation of Fiber Gratings"; 1999 OSA Conference, Sep. 23-25; 3 pgs.
Kashyap R.; "Fiber Bragg Gratings"; Academic Press, Ch. 9; pp. 430-433.
Kogelnik H; "Coupled Wave Theory for Thick Hologram Gratings"; The Bell System Technical Journal, 48(9):2909-2947 (1969).
Krug P.; "Measurement of Index Modulation Along an Optical Fiber Bragg Grating"; Optics Letters, 20(17):1767-1769.
Leith et al., "Holographic Data Storage in Three-Dimensional Media"; Applied Optics, vol. 5, No. 8, Aug. 1966; 21 pgs.
Shelia R. Nicerwarner-Peña, "Submicrometer Metallic Barcodes"; Science, vol. 294; Oct. 5, 2001; 5 pgs.
Ivan Oransky; "Sequencing on Compact Disc/ Microgenomics of Breast Cancer; Better Binding Site Prediction"; vol. 17 / Issue 13 / 35 / Jun. 30, 2003; 13 pgs.
Mark O. Worthington; "Curriculum Vitae"; Jan. 5, 2004; 4 pgs.

Yoshinobu Kohara; "DNA Probes on Beads Arrayed in a Capillary, 'Bead-Array',Exhibited High Hybridization Performance"; Nucleic Acids Research, 2002, vol. 30, No. 16 e87; 7 pgs.

"Electronically Scanned Confocal Imaging System"; IBM Technical Disclosure Bulletin; vol. 36; No. 06B; Jun. 1993; pp. 261-262.

Hideki Kambara; "Recent Progress in Fluorescent DNA Analyzers and Methods"; Current Topics in Analytical Chemisty; vol. 1. (1998) pp. 21-36.

G. Kakarantzas et al.; "Transmission Filters Based on Periodically Micro-tapered Fibre"; CLE0/2000/Friday Morning; 8:45 a.m.; pp. 574-575.

Michael C. Needels et al.; "Generation and Screening of an Oligonucleotide-Encoded synthetic Peptide Library"; proc Natl. Acad. Sci. USA, vol. 90;pp. 10700-10704, Nov. 1993.

W.R.Rigby; "An Anodizing Process for the Production of Inorganic Microfiltration membranes"; 2436 Transactions of the Institute of Metal Finishing;68 (1090) Aug., Part 3 p. 95-98.

Jain KK, Nanodiagnostics: Application of Nanotechnology in Molecular Diagnostics, Expert Review of Molecular Diagnostics 3(2):153-161 (2003), XP008038849.

Othonos, X. Lee; Superimposed Multiple Bragg Gratings, Nov. 10, 1994, vol. 30, No. 23.

Po Ki Yuen, Microbarcode Sorting Device; Science & Technology, Corning Incorparated, Corning, New York 14831-0007, USA.

International Search Report for International Application No. PCT/US2003/26315.

International Search Report for International Application No. PCT/US2003/26316.

International Search Report for International Application No. PCT/US2003/28862.

International Search Report for International Application No. PCT/US2003/28874.

International Search Report for International Application No. PCT/US2003/28875.

International Search Report for International Application No. PCT/US2003/28887.

International Search Report for International Application No. PCT/US2003/28890.

International Search Report for International Application No. PCT/US2003/29164.

International Search Report for International Application No. PCT/US2003/29244.

International Search Report for International Application No. PCT/US2004/01685.

International Search Report for International Application No. PCT/US2004/30037.

International Search Report for International Application No. PCT/US2004/30038.

International Search Report for International Application No. PCT/US2004/30300.

International Search Report for International Application No. PCT/US2004/32084.

International Search Report for International Application No. PCT/US2004/38416.

International Search Report for International Application No. PCT/US2005/05743.

International Search Report for International Application No. PCT/US2005/05745.

International Search Report for International Application No. PCT/US2005/26289.

International Search Report for International Application No. PCT/US2005/33694.

International Search Report for International Application No. PCT/US2005/41730.

International Search Report for International Application No. PCT/US2005/41731.

Material Safety Data Sheet Aquaclean 900; Aquabond Technologies (ABT); 1 pg.

Lide (CRC Handbook of Chemistry and Physics, 71st ed.).

Patil et al. (AAPS PharmSciTech, Mar. 24, 2006, vol. 7, pp. E1-E7).

International Search Report and Written Opinion for International Application No. PCT/US2003/29164.

International Search Report and Written Opinion for International Application No. PCT/US2004/01685.

International Search Report and Written Opinion for International Application No. PCT/US2004/30037.

International Search Report and Written Opinion for International Application No. PCT/US2004/30038.

International Search Report and Written Opinion for International Application No. PCT/US2004/30300.

International Search Report and Written Opinion for International Application No. PCT/US2004/32084.

International Search Report and Written Opinion for International Application No. PCT/US2004/38416.

International Search Report and Written Opinion for International Application No. PCT/US2005/05743.

International Search Report and Written Opinion for International Application No. PCT/US2005/05745.

International Search Report and Written Opinion for International Application No. PCT/US2005/26289.

International Search Report and Written Opinion for International Application No. PCT/US2005/33694.

International Search Report and Written Opinion for International Application No. PCT/US2005/41730.

International Search Report and Written Opinion for International Application No. PCT/US2005/41731.

US 6,780,301, 08/2004, Natan (withdrawn)

* cited by examiner

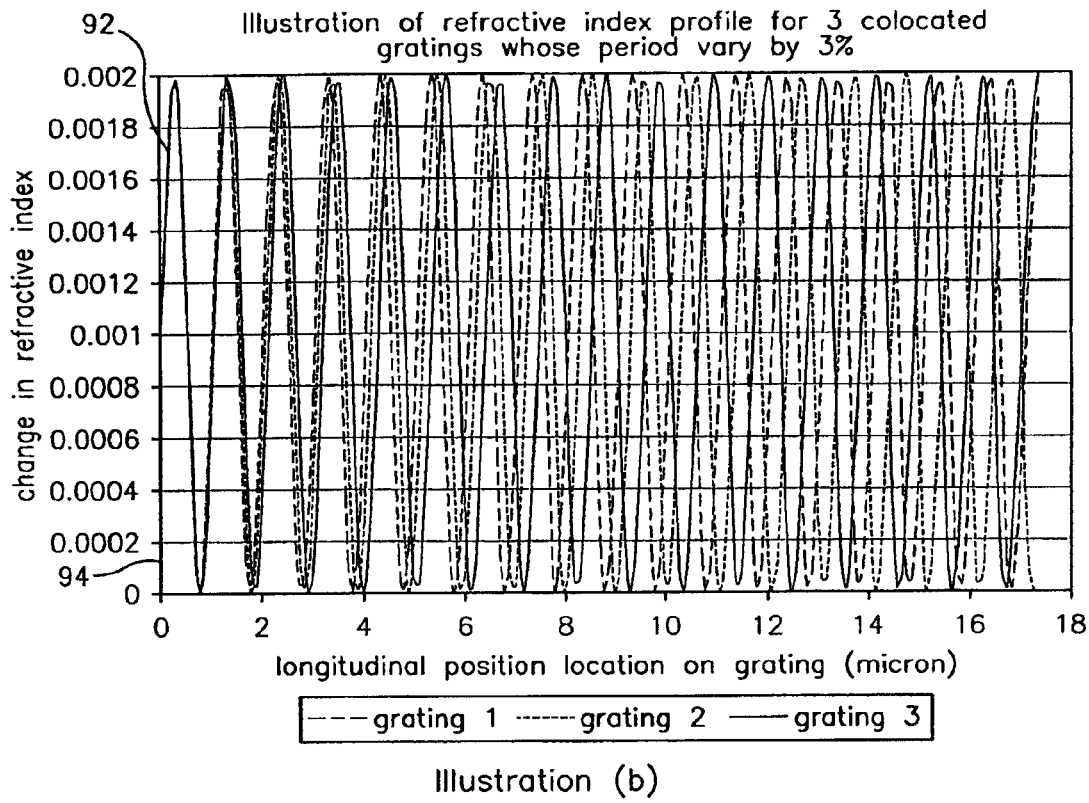
Illustration (b)
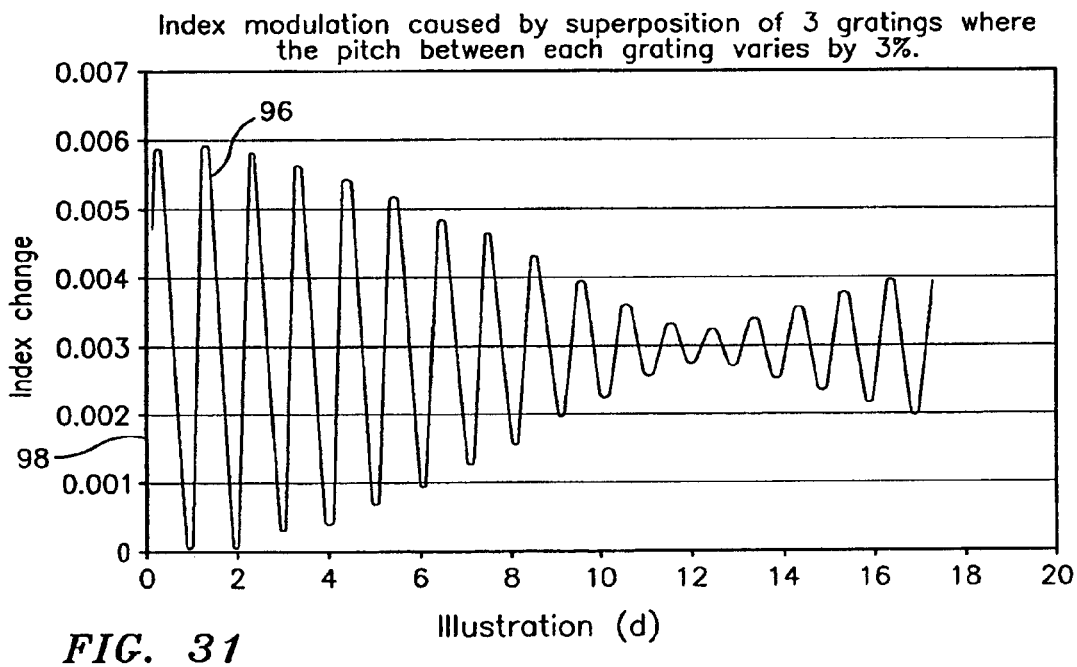
Illustration (d)
FIG. 31

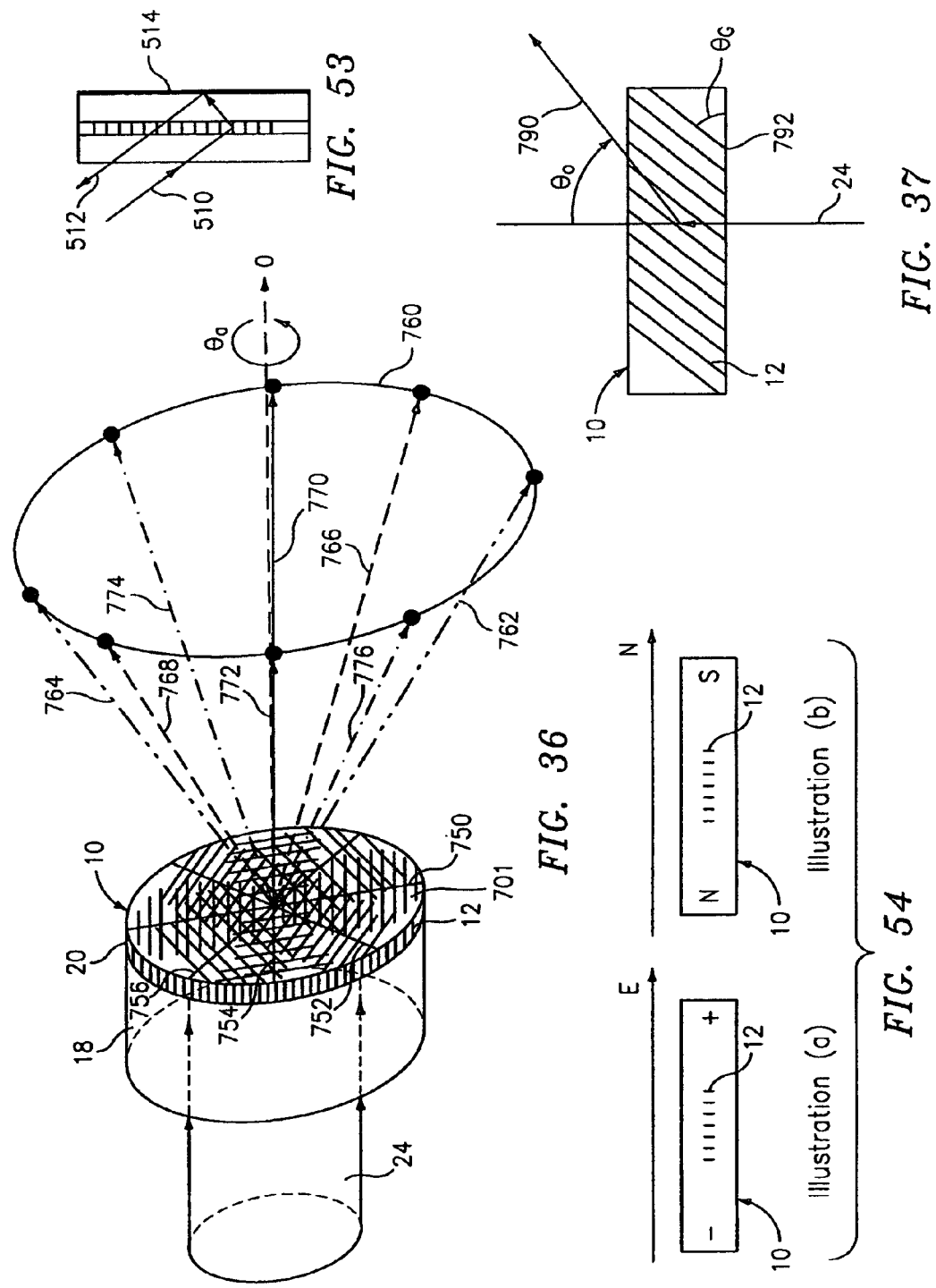

Illustration(a)    Illustration(b)    Illustration(c)

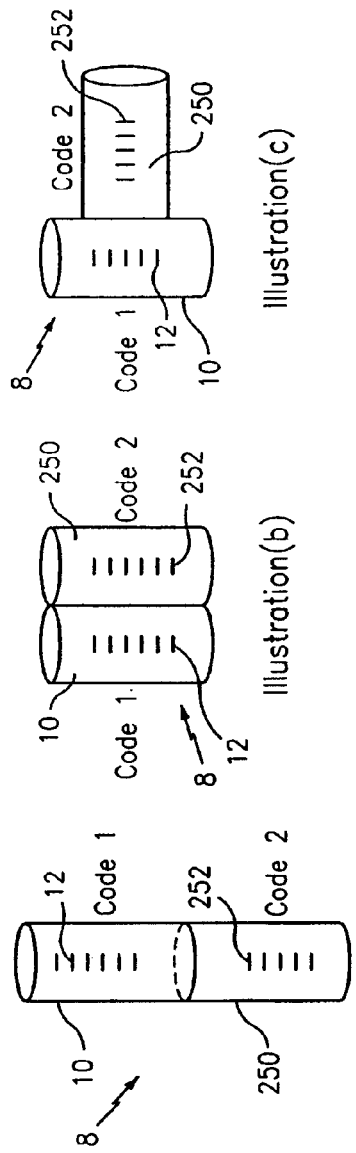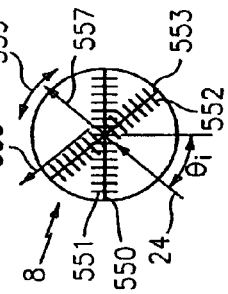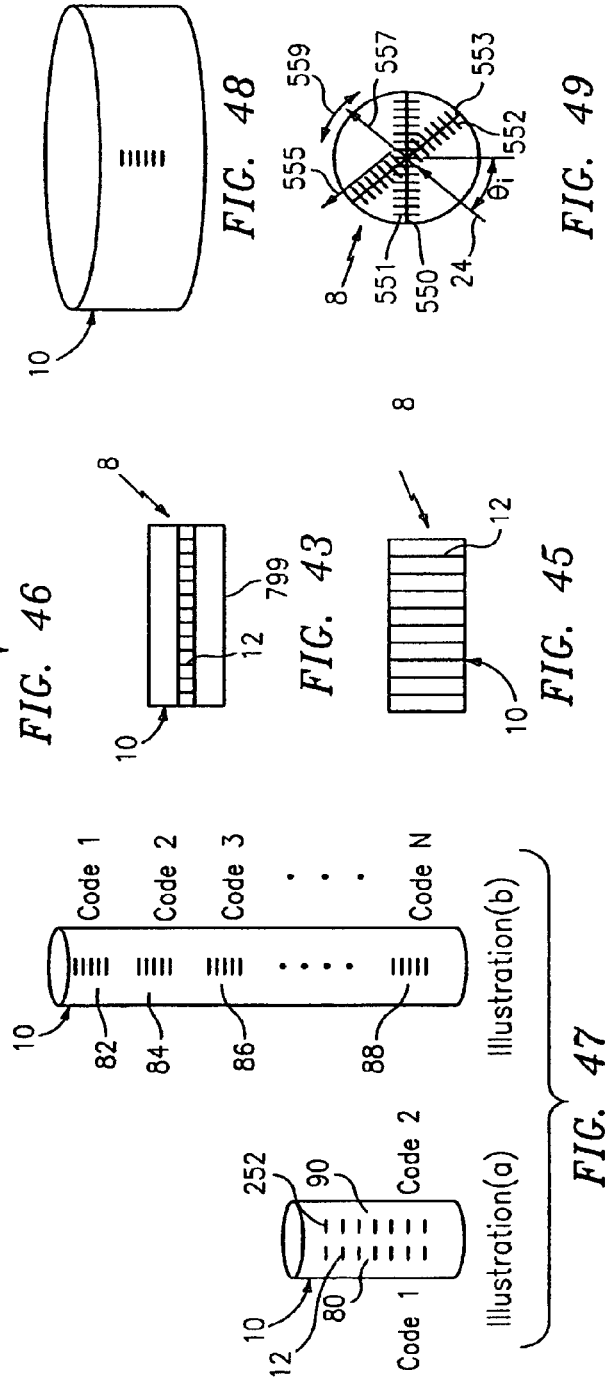

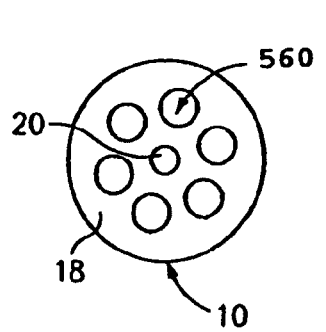
Illustration(a)
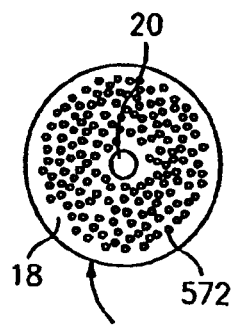
Illustration(b)
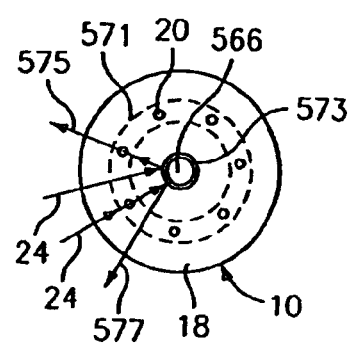
Illustration(c)
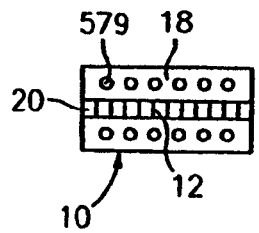
Illustration(d)
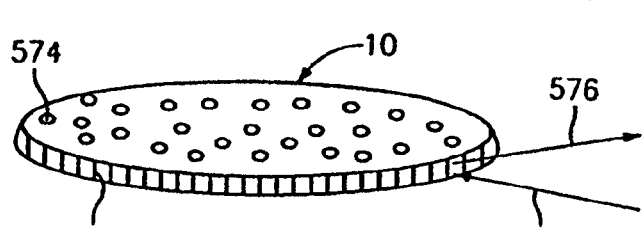
Illustration(e)
*FIG. 50*
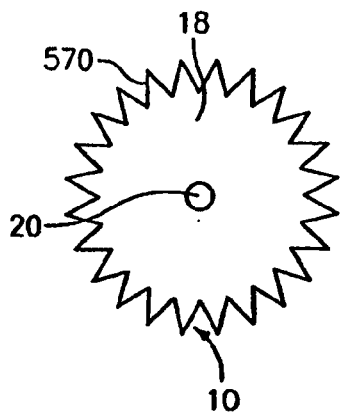
Illustration(a)
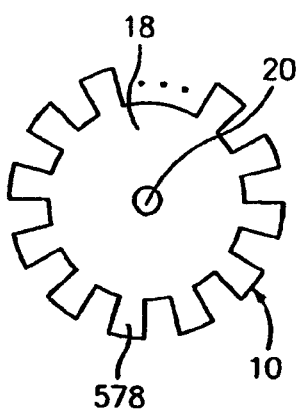
Illustration(b)
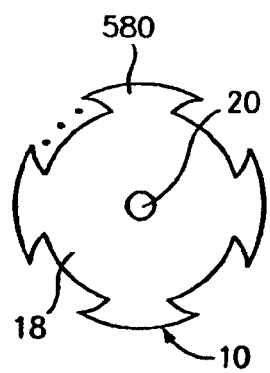
Illustration(c)
*FIG. 51*
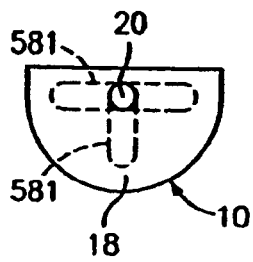
Illustration(a)
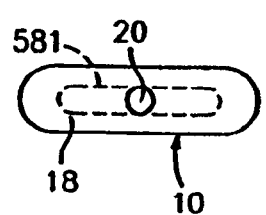
Illustration(b)
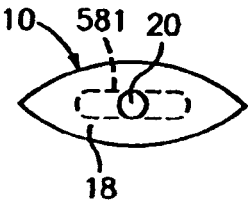
Illustration(c)
*FIG. 52*

US 7,898,735 B2

METHODS AND SYSTEMS FOR WRITING AN OPTICAL CODE WITHIN OR ON A FIBER SUBSTRATE

CROSS REFERENCE TO RELATED APPLICATIONS

This application is a continuation of and claims benefit to U.S. patent application Ser. No. 11/454,307, filed on Jun. 16, 2006, which is a continuation of U.S. patent application Ser. No. 10/661,116, filed on Sep. 12, 2003, which is a continuation in part of Ser. No. 10/645,689, filed on Aug. 20, 2003 and claims benefit to U.S. Provisional Patent Application No. 60/410,541, filed on Sep. 12, 2002, all of which are incorporated by reference in their entirety.

U.S. patent application Ser. No. 10/661,234 and application Ser. No. 10/661,082, were filed contemporaneously with the parent application, contains subject matter related to that disclosed herein, which is incorporated by reference in its entirety.

TECHNICAL FIELD

This invention relates to identification elements, and more particularly to method of manufacturing diffraction grating based optical identification elements.

BACKGROUND ART

Many industries have a need for uniquely identifiable objects or for the ability to uniquely identify objects, for sorting, tracking, and/or identification/tagging. Existing technologies, such as bar codes, electronic microchips/transponders, radio-frequency identification (RFID), and fluorescence and other optical techniques, are often inadequate. For example, existing technologies may be too large for certain applications, may not provide enough different codes, or cannot withstand harsh temperature, chemical, nuclear and/or electromagnetic environments.

Therefore, it would be desirable to obtain a coding element or platform that provides the capability of providing many codes (e.g., greater than 1 million codes), that can be made vera small, and/or that can withstand harsh environments.

SUMMARY OF THE INVENTION

Objects of the present invention include a method of manufacturing a plurality of diffraction grating based optical identification elements (microbeads) having unique codes.

According to the present invention, a method of manufacturing optical identification elements comprises forming a diffraction grating in a fiber substrate along a longitudinal axis of said substrate, said grating having a resultant refractive index variation, and cutting the substrate transversely to form a plurality of optical identification elements, said elements having said grating therein along substantially the entire length of said elements and each of said elements have substantially the same resultant refractive index variation.

The foregoing and other objects, features and advantages of the present invention will become more apparent in light of the following detailed description of exemplary embodiments thereof.

BRIEF DESCRIPTION OF THE DRAWINGS

FIG. 36 is a perspective view showing azimuthal multiplexing of a thin grating for an optical identification element, in accordance with the present invention.

FIG. 37 is side view of a blazed grating for an optical identification element, in accordance with the present invention.

FIG. 43 is a side view of an optical identification element having a coating, in accordance with the present invention.

FIG. 45 is a side view of an optical identification element having a grating across an entire dimension, in accordance with the present invention.

FIG. 46, illustrations (a)-(c), are perspective views of alternative embodiments for an optical identification element, in accordance with the present invention.

FIG. 47, illustrations (a)-(b), are perspective views of an optical identification element having multiple grating locations, in accordance with the present invention.

FIG. 48, is a perspective view of an alternative embodiment for an optical identification element, in accordance with the present invention.

FIG. 49 is a view an optical identification element having a plurality of gratings located rotationally around the optical identification element, in accordance with the present invention.

FIG. 50 illustrations (a)-(e) show various geometries of an optical identification element that may have holes therein, in accordance with the present invention.

FIG. 51 illustrations (a)-(c) show various geometries of an optical identification element that may have teeth thereon, in accordance with the present invention.

FIG. 52 illustrations (a)-(c) show various geometries of an optical identification element, in accordance with the present invention.

FIG. 53 is a side view an optical identification element having a reflective coating thereon, in accordance with the present invention.

FIG. 54 illustrations (a)-(b) are side views of an optical identification element polarized along an electric or magnetic field, in accordance with the present invention.

BEST MODE FOR CARRYING OUT THE INVENTION

Figure 1:
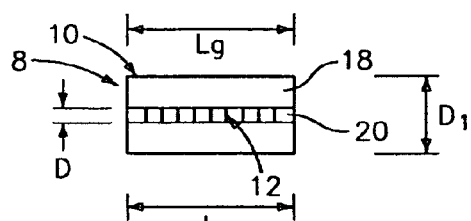
FIG. 1 is a side view of an optical identification element, in accordance with the present invention.

Referring to FIG. 1, a diffraction grating-based optical identification element 8 (or encoded element or coded element) comprises a known optical substrate 10, having an optical diffraction grating 12 disposed (or written, impressed, embedded, imprinted, etched, grown, deposited or otherwise formed) in the volume of or on a surface of a substrate 10. The grating 12 is a periodic or aperiodic variation in the effective refractive index and/or effective optical absorption of at least a portion of the substrate 10.

The optical identification element 8 described herein is the same as that described in Copending patent application Ser. No. 10/661,234, filed contemporaneously with the parent application, which is incorporated herein by reference in its entirety.

In particular, the substrate 10 has an inner region 20 where the grating 12 is located. The inner region 20 may be photosensitive to allow the writing or impressing of the grating 12. The substrate 10 has an outer region 18, which does not have the grating 12 therein.

The grating 12 is a combination of one or more individual spatial periodic sinusoidal variations (or components) in the refractive index that are collocated at substantially the same location on the substrate 10 along the length of the grating region 20, each having a spatial period (or pitch) $\Lambda$. The resultant combination of these individual pitches is the grating 12, comprising spatial periods ($\Lambda 1$-$\Lambda n$) each representing a bit in the code. Thus, the grating 12 represents a unique optically readable code, made up of bits, where a bit corresponds to a unique pitch $\Lambda$ within the grating 12. Accordingly, for a digital binary (0-1) code, the code is determined by which spatial periods ($\Lambda 1$-$\Lambda n$) exist (or do not exist) in a given composite grating 12. The code or bits may also be determined by additional parameters (or additional degrees of multiplexing), and other numerical bases for the code may be used, as discussed herein and/or in the aforementioned patent application.

The grating 12 may also be referred to herein as a composite or collocated grating. Also, the grating 12 may be referred to as a "hologram", as the grating 12 transforms, translates, or filters an input optical signal to a predetermined desired optical output pattern or signal.

The substrate 10 has an outer diameter D1 and comprises silica glass ($SiO_2$) having the appropriate chemical composition to allows the grating 12 to be disposed therein or thereon. Other materials for the optical substrate 10 may be used if desired. For example, the substrate 10 may be made of any glass, e.g., silica, phosphate glass, borosilicate glass, or other glasses, or made of glass and plastic, or solely plastic. For high temperature or harsh chemical applications, the optical substrate 10 made of a glass material is desirable. If a flexible substrate is needed, plastic, rubber or polymer-based substrate may be used. The optical substrate 10 may be any material capable of having the grating 12 disposed in the grating region 20 and that allows light to pass through it to allows the code to be optically read.

The optical substrate 10 with the grating 12 has a length L and an outer diameter D1, and the inner region 20 diameter D. The length L can range from very small "microbeads" (or microelements, micro-particles, or encoded particles), about 1-1000 microns or smaller, to larger "macrobeads" or "macroelements" for larger applications (about 1.0-1000 mm or greater). In addition, the outer dimension D1 can range from small (less than 1000 microns) to large (1.0-1000 mm and greater). Other dimensions and lengths for the substrate 10 and the grating 12 may be used.

The grating 12 may have a length Lg of about the length L of the substrate 10. Alternatively the length Lg of the grating 12 may be shorter than the total length L of the substrate 10.

The outer region 18 is made of pure silica ($SiO_2$) and has a refractive index n2 of about 1.458 (at a wavelength of about 1553 nm), and the inner grating region 20 of the substrate 10 has dopants, such as germanium and/or boron, to provide a refractive index n1 of about 1.453, which is less than that of outer region 18 by about 0.005. Other indices of refraction n1,n2 for the grating region 20 and the outer region 18, respectively, may be used, if desired, provided the grating 12 can be impressed in the desired grating region 20. For example, the grating region 20 may have an index of refraction that is larger than that of the outer region 18 or grating region 20 may have the same index of refraction as the outer region 18 if desired.

Figure 2:
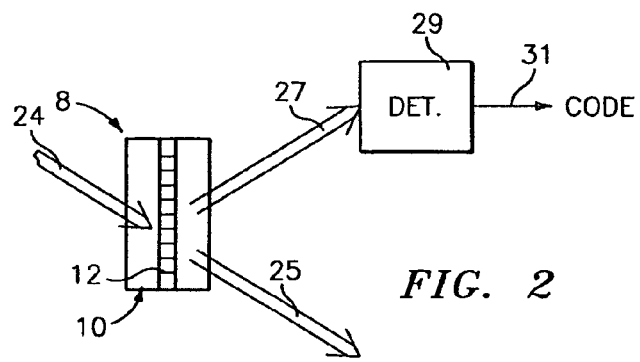
FIG. 2 is a top level optical schematic for reading a code in an optical identification element, in accordance with the present invention.

Referring to FIG. 2, an incident light 24 of a wavelength $\lambda$, e.g., 532 nm from a known frequency doubled Nd:YAG laser or 632 nm from a known Helium-Neon laser, is incident on the grating 12 in the substrate 10. Any other input wavelength $\lambda$ can be used if desired provided $\lambda$ is within the optical transmission range of the substrate (discussed more herein and/or in the aforementioned patent application). A portion of the input light 24 passes straight through the grating 12, as indicated by a line 25. The remainder of the input light 24 is reflected by the grating 12, as indicated by a line 27 and provided to a detector 29. The output light 27 may be a plurality of beams, each having the same wavelength $\lambda$ as the input wavelength $\lambda$ and each having a different output angle indicative of the pitches ($\Lambda 1$-$\Lambda n$) existing in the grating 12. Alternatively, the input light 24 may be a plurality of wavelengths and the output light 27 may have a plurality of wavelengths indicative of the pitches ($\Lambda 1$-$\Lambda n$) existing in the grating 12. Alternatively, the output light may be a combination of wavelengths and output angles. The above techniques are discussed in more detail herein and/or in the aforementioned patent application.

The detector 29 has the necessary optics, electronics, software and/or firmware to perform the functions described herein. In particular, the detector reads the optical signal 27 diffracted or reflected from the grating 12 and determines the code based on the pitches present or the optical pattern, as discussed more herein or in the aforementioned patent application. An output signal indicative of the code is provided on a line 31.

Figure 3:
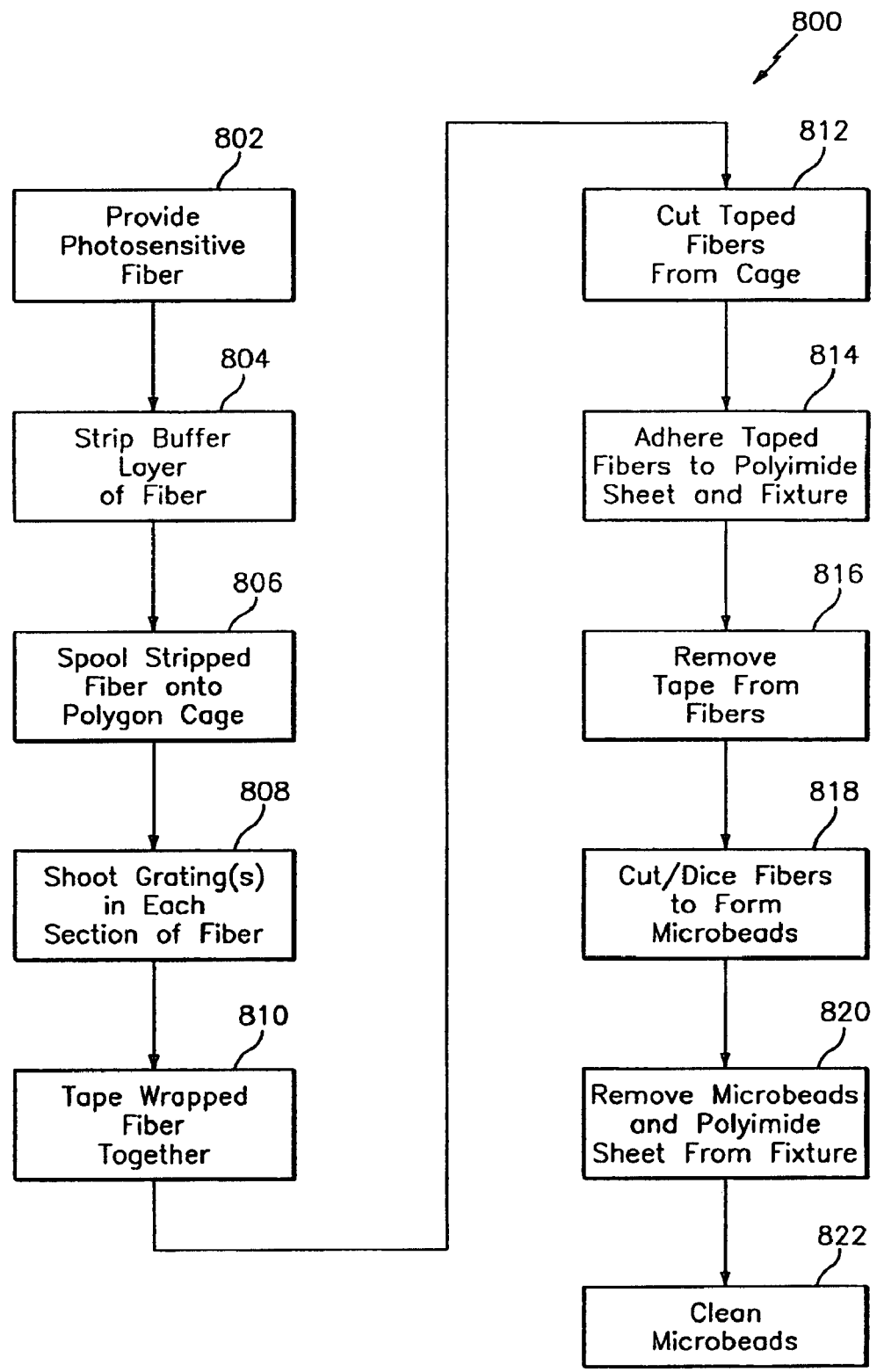
FIG. 3 is a block diagram of the steps of manufacturing a diffraction grating-based optical identification element or microbead, in accordance with the present invention.

FIG. 3 shows a method 800 of manufacturing a microbead 8 similar to that described hereinbefore in accordance with the present invention. The first step 802 includes providing a photosensitive substrate or fiber 830. To simplify the description of the method of manufacturing, the substrate will be referred to as a fiber with the understanding that the microbeads 8 may be formed of any photosensitive substrate.

The fiber 830 may be made of any material that has sufficient photosensitivity to allows a diffraction grating 12 to be disposed therein, that represents a code that can be interrogated as described herein and/or in the aforementioned patent application. The fiber 830 may be doped or loaded with any dopant now known or later discovered that allows the fiber to exhibit the necessary level of photosensitivity for the incident radiation (e.g., UV or other actinic radiation) used for writing the grating 12, such as, hydrogen, deuterium, boron, germanium, lead, or other dopants that provide photosensitivity, some of which are described in Patent Nos.: U.S. Pat. No. 6,436,857 to Brueck et al, U.S. Pat. No. 5,287,427 to Atkins et al, U.S. Pat. No. 5,235,659 to Atkins et al, U.S. Pat. No. 6,327,406 to Cullen et al, WO 00/44683 to Samsung Electronics Co. LTD, U.S. Pat. No. 6,221,566 to Kohnke et al, U.S. Pat. No. 6,097,512 to Ainslie et al; and U.S. Pat. No. 6,075,625 to Ainslie et al.

In step 804, the photosensitive fiber 830 is then stripped of the coating or buffer disposed on its outer surface and then cleaned. In step 806, the stripped fiber is then wound around a cage or basket 832 having a generally polygon shape so that the wound fiber has sections 831 of flat areas.

Figure 4:
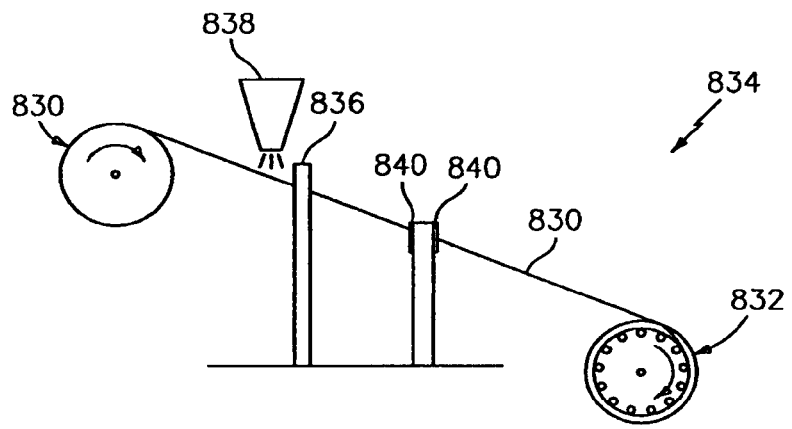
FIG. 4 is an elevational view of a fiber stripping station, in accordance with the present invention.

FIG. 4 illustrates a fixture/set-up 834 for accomplishing steps 802-804. The photosensitive fiber 830 is threaded through a blade 836 for stripping the buffer from the fiber. A heater 838 is disposed prior to the stripper 836 to heat and soften the buffer to ease the removal of the buffer from the fiber. The stripped fiber then passes through or between a pair of pads 840 soaked with a solvent, such as acetone, to clean the fiber. The fiber 830 is then wound about the cage 832. While not shown, the set-up 834 may include one or more pulleys or rollers to provide tension on the fiber when winding the fiber onto the cage.

Figure 6:
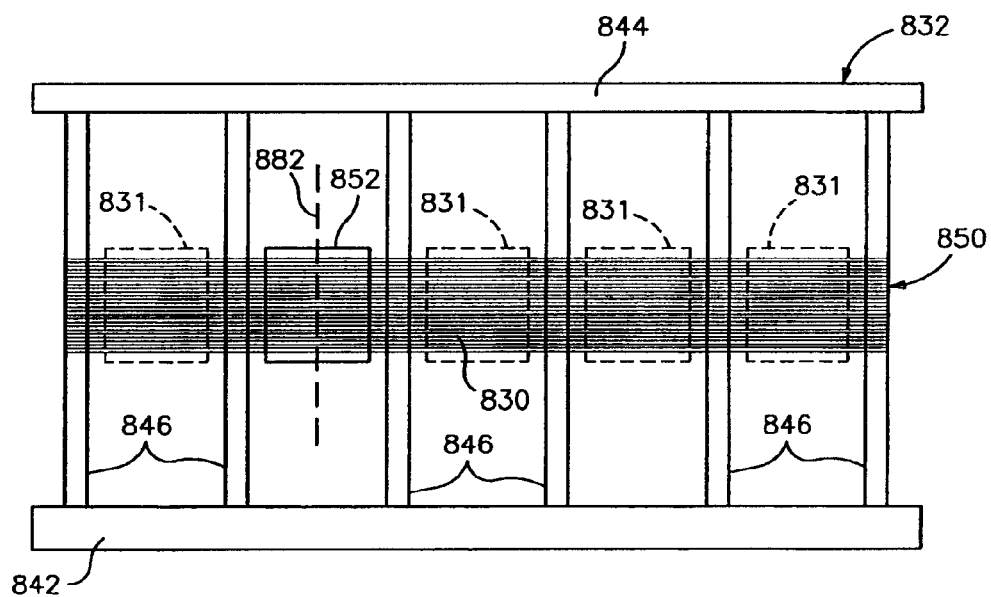
FIG. 6 is a side view of a cage having a fiber ribbon wound thereabout, in accordance with the present invention.
Figure 5:
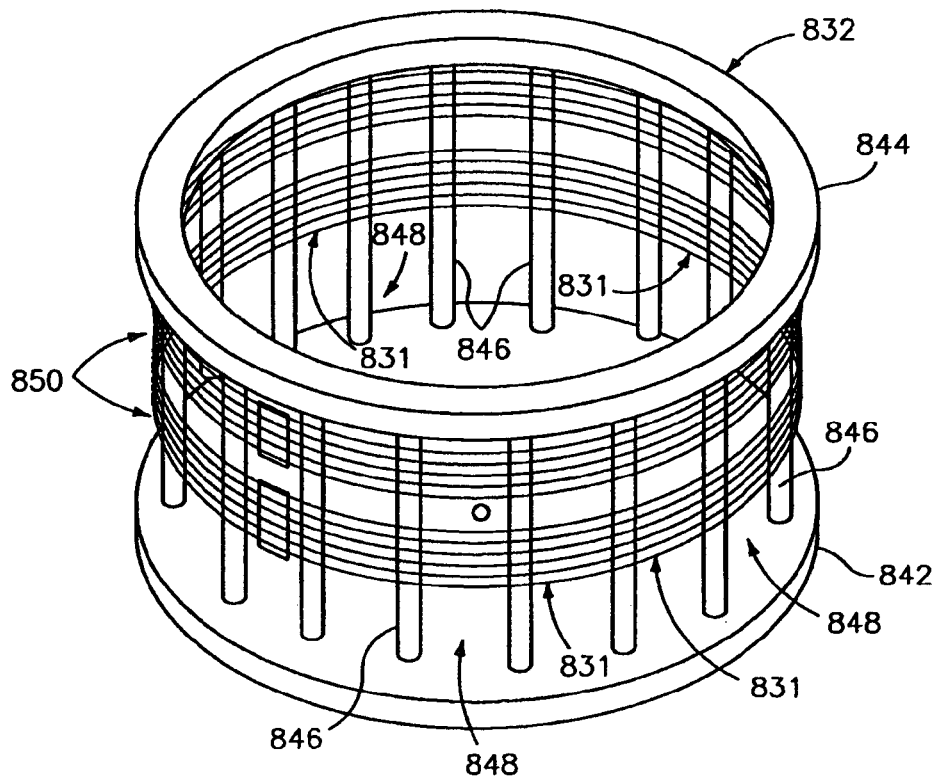
FIG. 5 is a perspective view of a cage having a pair of fiber ribbons wound thereabout, in accordance with the present invention.

As best shown in FIGS. 5 and 6, the cage 832 has a lower plate 842 and an upper ring support 844 with a plurality of rods 846 connected therebetween. The rods are equi-spaced about the circumference of the cage. In the embodiment shown, the cage 832 includes 16 openings 848, however, the invention contemplates having any number of openings. When wound around the rods 846 of the cage 832, each wrap of fiber is adjacent to and touches each adjacent wrap to form a single layer of fiber ribbon 850 around the cage. The fiber is wrapped around the cage between 100-120 times to effectively form a single layer ribbon of fibers. The invention contemplates any number of wraps of fiber around the cage. The fiber ribbon 850 forms a polygonal shape when wrapped around the cage 832 to provide a plurality of flat sections (16 sections) 831. These flat sections 831 of the fiber ribbon 850 provides the area of the fiber that a grating 12 is written in, which will be described in greater detail hereafter. As best shown in FIG. 6, one section 831 of the fiber ribbon 850 is tape together at 852, including the ends of the fiber, to maintain the tension of the fiber around the cage and to maintain the single layer of the fiber ribbon.

While FIG. 6 shows a single fiber ribbon 850 disposed on the cage 832, the present invention contemplates that a plurality of fiber ribbons 850 may be axially spaced on the cage, as shown in FIG. 5.

Figure 7:
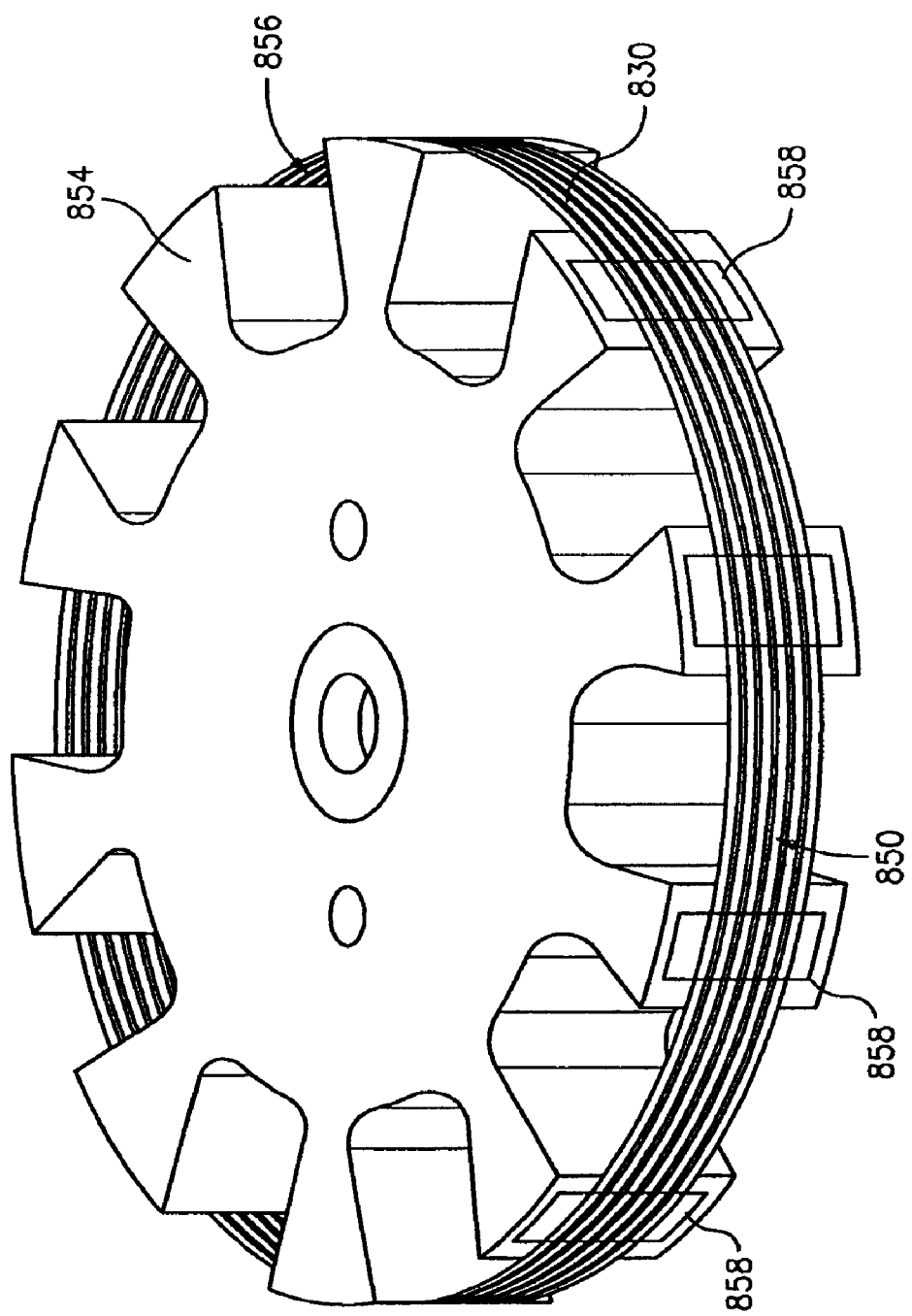
FIG. 7 is a perspective view of a disk having a fiber ribbon wound thereabout, in accordance with the present invention.

FIG. 7 illustrates that the stripped fiber 830 may by wound around a disk 854 having a plurality of circumferentially spaced dovetailed slots 856, wherein the fiber ribbon 850 is taped at 858 to the outer circumference of the disk.

The next step 808 of FIG. 3 is to write or shoot the diffraction grating(s) 12 into each section 831 (see FIGS. 8 and 9) of the fiber ribbon 850. The grating 12 may be impressed in the fiber 830 by any technique for writing, impressed, embedded, imprinted, or otherwise forming a diffraction grating in the volume of or on a surface of a substrate 10. Examples of some known techniques are described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, respectively, and U.S. Pat. No. 5,367,588, entitled "Method of Fabricating Bragg Gratings Using a Silica Glass Phase Grating Mask and Mask Used by Same", to Hill, and U.S. Pat. No. 3,916,182, entitled "Periodic Dielectric Waveguide Filter", Dabby et al, and U.S. Pat. No. 3,891,302, entitled "Method of Filtering Modes in Optical Waveguides", to Dabby et al, which are all incorporated herein by reference to the extent necessary to understand the present invention.

Alternatively, instead of the grating 12 being impressed within the fiber material, the grating 12 may be partially or totally created by etching or otherwise altering the outer surface geometry of the substrate to create a corrugated or carving surface geometry of the substrate, such as is described in U.S. Pat. No. 3,891,302, entitled "Method of Filtering Modes in Optical Waveguides", to Dabby et al, which is incorporated herein by reference to the extent necessary to understand the present inventions provided the resultant optical refractive profile for the desired code is created.

Further, alternatively, the grating 12 may be made by depositing dielectric layers onto the substrate, similar to the way a known thin film filter is created, so as to create the desired resultant optical refractive profile for the desired code.

Figure 8:
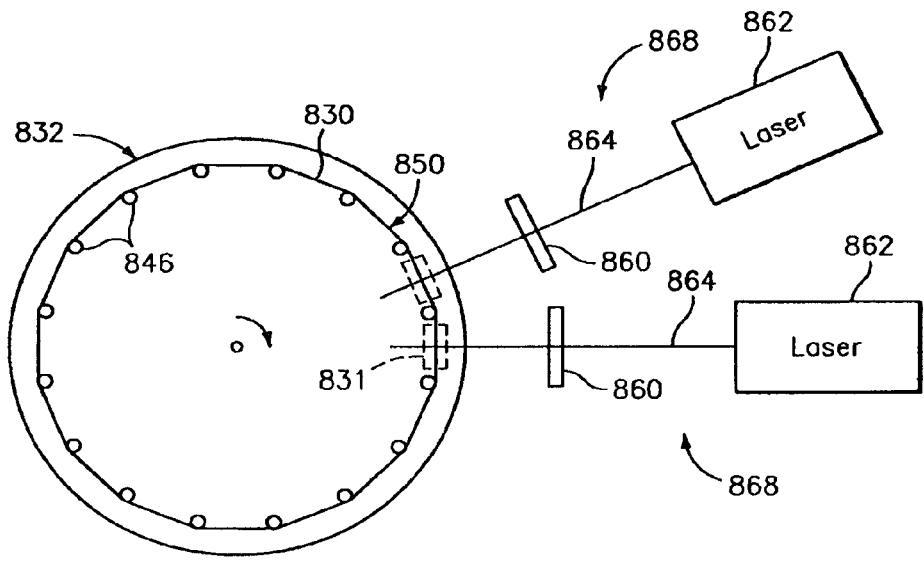
FIG. 8 is a top view of a grating writing station, in accordance with the present invention.

FIG. 8 shows the method of writing a grating 12 into the fibers 830 of the ribbon 850 using at least one phase mask 860. A laser 862, such as an excimer laser or $CO_2$ laser, provides an ultra-violet (UV) beam 864, which passes through the phase mask to write a grating 12 having a predetermined profile corresponding to the phase mask. In one embodiment, one phase mask 860 may be used to write the grating into the fiber 830 to provide one unique code for the microbead 8. Each unique phase mask therefore represents one unique code, thereby requiring a phase mask for each code used. Using only one phase mask to generate each code becomes very expensive and difficult to manufacture when the number of unique codes needed increases.

In another embodiment each unique code may be generated by writing a plurality of co-located grating 12 into each section 831 of the fiber ribbon 850. For example, the resulting grating in a particular section 831 (or microbead 8) may comprise any combination of eight (8) gratings using eight (8) different phase masks 860. Consequently the number of unique gratings or codes using eight phase masks equal $2^8$. The phase mask may be mounted to a carriage 866, similar to that shown in FIGS. 20 and 21, that translates parallel to the fiber ribbon 850 to select the mask 860 for writing the desired grating 12. The invention further contemplates that the phase masks are mounted on a wheel (not shown) that can be rotated to select the desired phase mask.

Each of the 16 sections 831 of the fiber ribbon 850 may be written with the same grating 12. Alternatively, each section may have a different grating written therein, each section therefore having a different code associated therewith. To provide different gratings 12 for each section 831 using the co-located grating method, each section would use a different combination of phase masks to write each grating. For example, the first, third and fifth phase masks of the 8 phase masks may be used to write the grating that comprises the three co-located gratings written into the first section 831 of the fiber ribbon 850. For the second section 831 of the fiber ribbon, the first, fifth, sixth and eight phase masks may be used to write the grating that comprises the four co-located gratings written into the second section. The other sections of the fiber ribbon may be similarly written using different combinations of phase masks. While the embodiment shows two grating writing stations 868, it is contemplated the only one station may be used or any number of stations.

Figure 9:
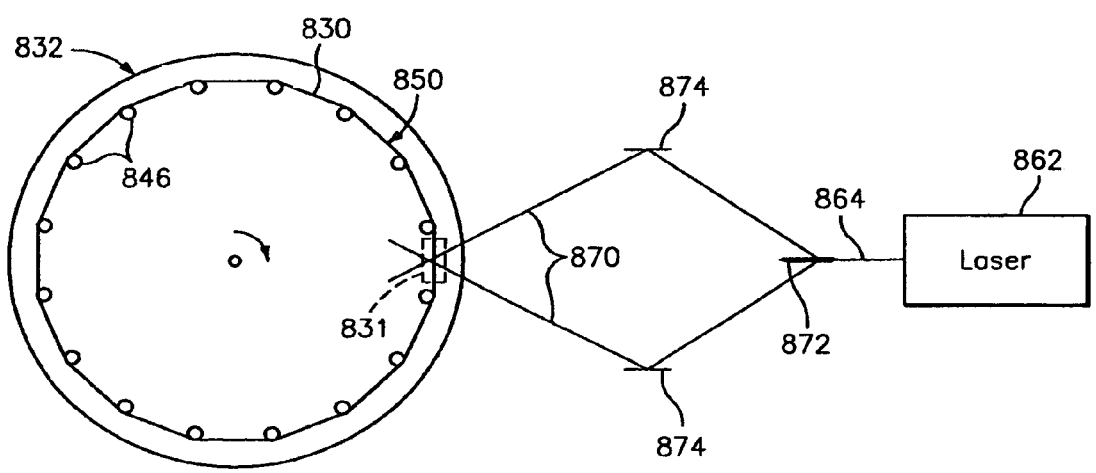
FIG. 9 is a top view of another embodiment of a grating writing station, in accordance with the present invention.

FIG. 9 shows another method of writing the gratings 12 into each section 831 of the fiber ribbons 850 by using interfering beams 870 provided by a laser 862. As shown the UV beam 864 is split by a mirror 872 and reflected to a pair of complementary mirrors 874. The complementary mirrors 874 reflect the UV beams 870 back to interfere with each other at the fiber ribbon 850 to form the grating 12. Similar to that described hereinbefore, a single grating may be written in the sections 831 of the fiber ribbon or a plurality of co-located gratings may be written. To change the grating profile or interference pattern to create a different grating 12, the complementary mirrors 874 may be tilted to a different angle.

Figure 10:
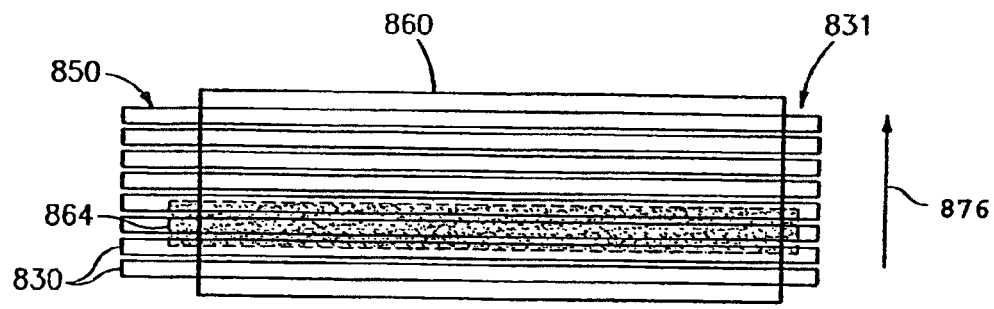
FIG. 10 is a front view of a section of a fiber ribbon and a projection of a UV beam from a laser for writing a grating that is narrower than the width of the fiber ribbon, in accordance with the present invention.

FIG. 10 illustrates a scanning method for exposing each section 831 of the fiber ribbon 850 using a phase mask 860. In this method, the width of the UV beam 864 used to write the grating 12 is smaller than the width of the fiber ribbon 850. The UV beam 864 translates along the width of the fiber ribbon to scan each of the wraps of fiber 830 in the section of fiber ribbon. In this instance, the beam scan direction 876 is from bottom to top, however, the direction of scan may be from top to bottom of the section. The UV beam 864 may be scanned upward by translating the laser 862, or alternatively, the cage 832 may translated upward and downward in the axial direction.

Figure 11:
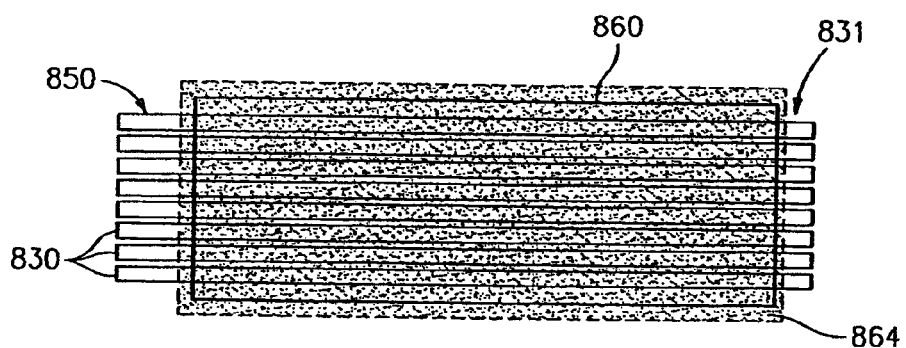
FIG. 11 is a front view of a section of a fiber ribbon and a projection of a UV beam from a laser for writing a grating that is wider than the width of the fiber ribbon, in accordance with the present invention.

Alternatively, FIG. 11 illustrates a stationary or blanket method for exposing each section 831 of the fiber ribbon 850 using a phase mask 860. In this method, the width of the UV beam 864 used to write the grating 12 is as wide as or wider than the width of the fiber ribbon 850. This method enables the entire section 831 to be exposed and a grating written in a single exposure.

Figure 12:
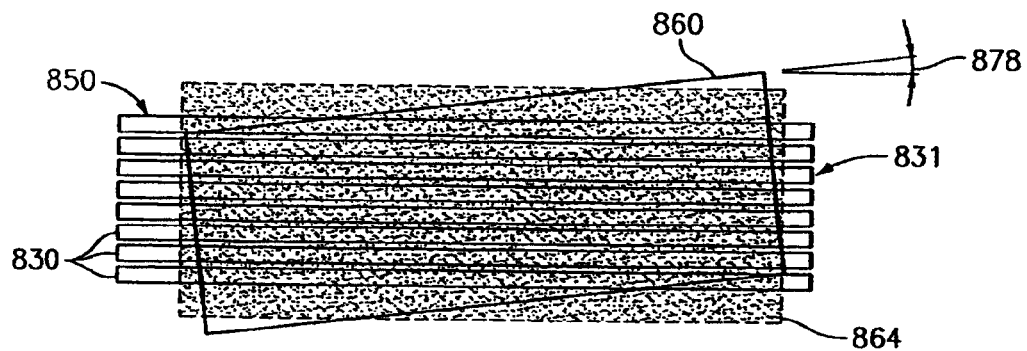
FIG. 12 is a front view of a section of a fiber ribbon and a projection of a UV beam from a laser and a phase mask tilted at a blaze angle, in accordance with the present invention.

It is important that the phase mask 860 is square, and not angle, to the section 831 of the fiber ribbon 850 to minimize the blaze angle 878 of the grating 12 as illustrated in FIG. 12. If the blaze angle 878 is too large (e.g., >0.1 degree), the microbeads 8 may not exhibit a code to the reader, as the Bragg condition no longer falls with the Bragg envelope.

Figure 14:
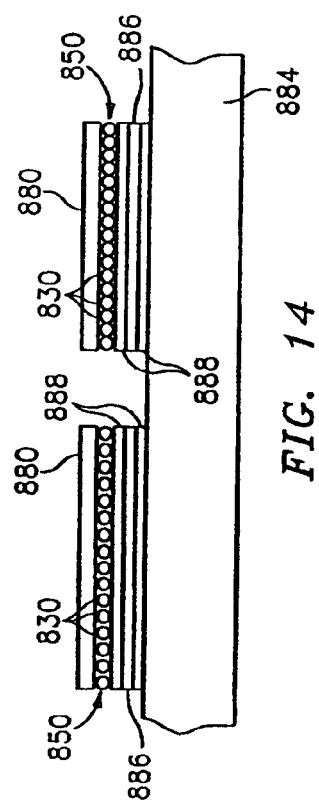
FIG. 14 is a side view of a plurality of fiber ribbons adhered to a test fixture, in accordance with the present invention.

In step 810 of FIG. 3, after the gratings 12 are written into each section 831 of the fiber ribbon 850 (except the taped section), a strip of tape 880 (e.g., Kapton tape) is adhered to the outer surface of the fiber ribbon 850 as best shown in FIG. 14. In step 812 of FIG. 3, once taped, the fiber ribbon is cut off the cage 832 by cutting through the taped section 852 of the fiber ribbon 850 at 882 as shown in FIG. 6.

Figure 13:
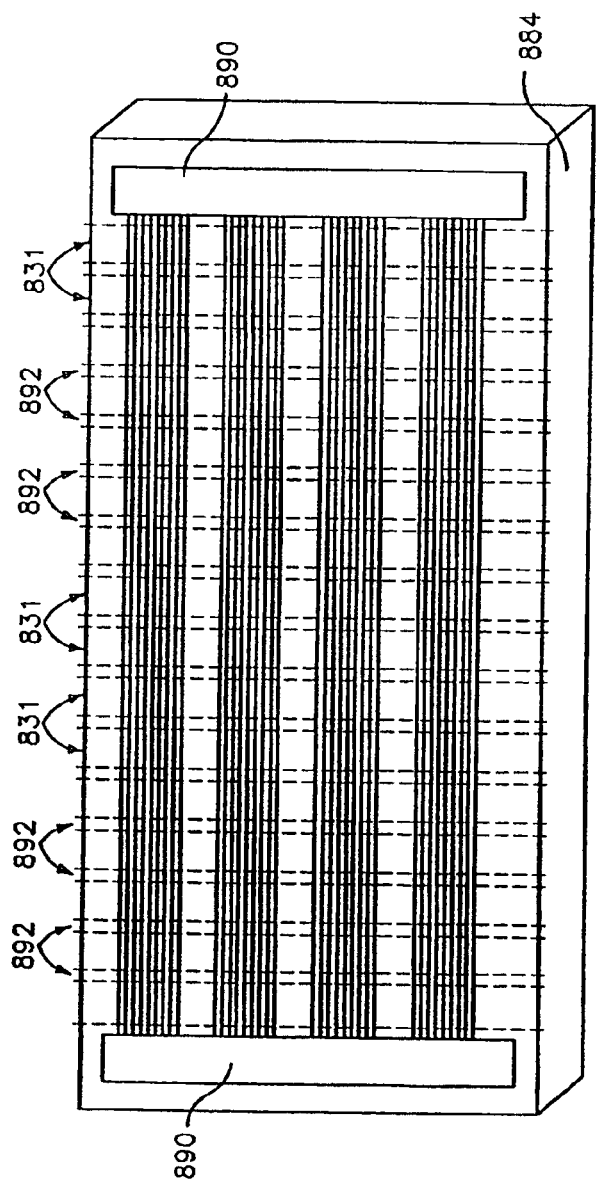
FIG. 13 is a perspective view of a plurality of fiber ribbons adhered to a test fixture, in accordance with the present invention.

In step 814, the fiber ribbon 850 is flattened and mounted to a thermally conductive fixture 884, as shown in FIGS. 13 and 14. As best shown in FIG. 14, each ribbon 850 is bonded to a plastic sheet material 886 (e.g., polyimide sheet material) that is bonded to the fixture. The adhesive 888 used to bond the polyimide sheet 886 to the fixture 884 and the fiber ribbon 850 to the polyimide sheet is a water-soluble thermoset adhesive, such as that known as Aquabond®. In FIG. 13, the fiber ribbons are secured to the fixture by a pair of clamps 890. The length of the fiber ribbons is approximately 632 mm. Once the fiber ribbons are clamped to the fixture 884, the fixture is heated to liquefy the adhesive 888, which then encases the fibers 830 in the adhesive. The adhesive 888 is allowed to cool and harden to thereby encase the fibers and bond to the polyimide sheet 886 and bond the polyimide sheet to the fixture.

Figure 15:
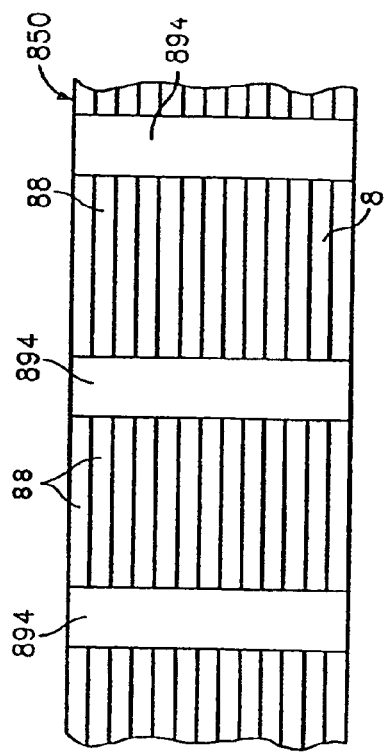
FIG. 15 is an expanded top view of a portion of the diced fiber ribbon, in accordance with the present invention.

In step 816 of FIG. 3, the kapton tape 880 is then removed from the fiber ribbons 850. In step 818, each section 831 having a grating 12 is cut or diced to form the microbeads 8, as shown in FIG. 15. The intermediate sections 892 having no gratings (see FIG. 13) are not dice and left long. The blades cut sufficiently deep to cut the fibers 830 and score the polyimide sheet 886 without cutting fully through the sheet. FIG. 15 shows a portion of the fiber ribbon 850 and the kerfs 894 created by the cutting blade. Before removing the fiber ribbons from the fixture 884, the intermediate sections 892 are removed from the polyimide sheet 886. One method is to cut that portion away with a blade having a wide kerf. Alternatively, the fixture can be heated to soften the adhesive 888 to permit the intermediate sections 892 of the ribbon 850 to be scraped away. Once the intermediate sections 892 are removed from the fiber ribbons 850, the fiber ribbons are removed from the fixture 884 by heating the fixture to soften the adhesive between the polyimide sheet and the fixture.

Figure 16:
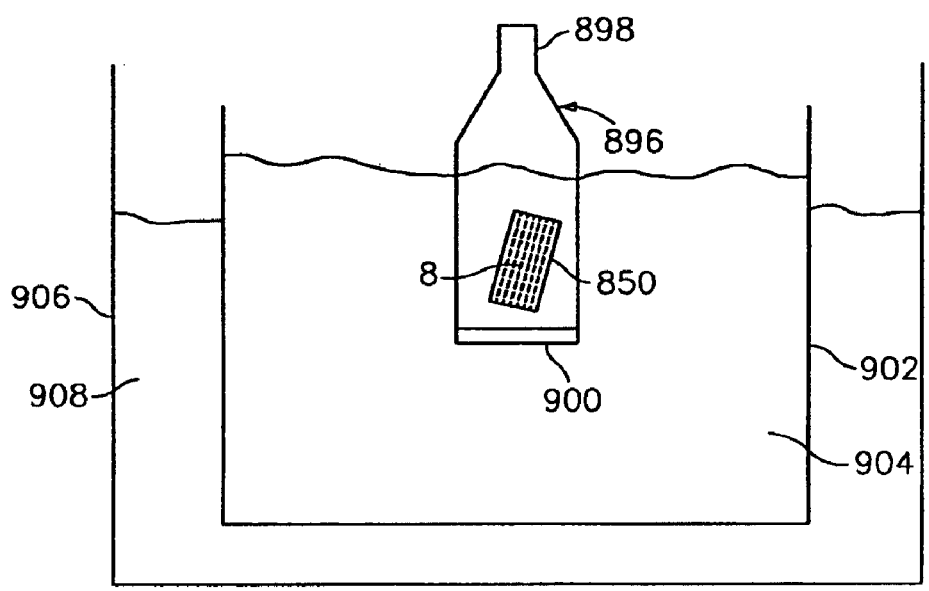
FIG. 16 is a side view of separation station having a section of fiber ribbon disposed in a vessel, in accordance with the present invention.

In step 820 of FIG. 3, the microbeads 8 are removed from each of section 831 of the fiber ribbon 850. The polyimide sheet 886 is cut across each of the intermediate sections to separate each of the sections 831 having a group of microbeads 8. As shown in FIG. 16, one or more sections 831 having the same code are place within a vessel 896 having a tapered open end 898 and another end having a removable filter 900 (40 um filter material). The section 850 having microbeads 8 is placed into the vessel 896 by removing the filter 900 and replacing it. The vessel is placed filter end down within a vat 902 having water and solvent (e.g., Aquaclean®) solution 904 heated to approximately 86 degrees Celsius. The vat 902 is then placed within an ultrasonic bath 906 of pure water 908, which vibrates the water at approximately 80 KHz. The solution 902 passes through the filter 900 of the vessel 896 and dissolves the water soluble adhesive 888 holding the microbeads 8 to the polyimide sheet 886. The ultrasonic vibration assists with separating the microbeads from the polyimide sheet.

Figure 17:
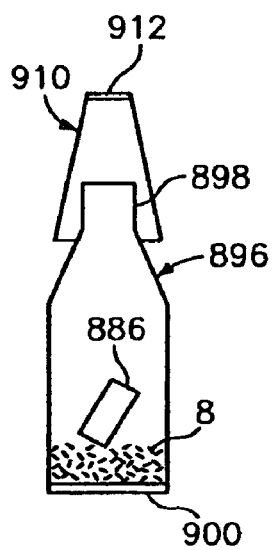
FIG. 17 is a side view of the vessel of FIG. 16 having a vial disposed on one end of the vessel, in accordance with the present invention.
Figure 18:
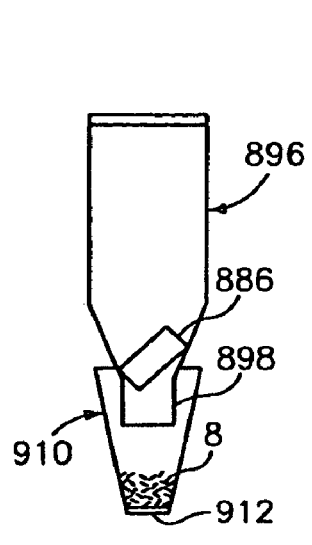
FIG. 18 is a side view of the vessel and vial of FIG. 16 in a turned over orientation, in accordance with the present invention.
Figure 19:
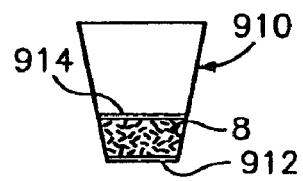
FIG. 19 is a side view of microbeads disposed within a vial, in accordance with the present invention.

In step 822 of FIG. 3, the microbeads 8 are cleaned and stored. As shown in FIGS. 17 and 18, the vessel 896 is then removed from the vat 902 and a polyethylene vial 910 is placed over the tapered opening 898 of the vessel 896, as shown in FIGS. 17-18. The vessel and vile are then turned upside down and flushed with de-ionized water to clean the microbeads 8. Consequently, the microbeads 8 flows from the vessel 896 to the vial 910. The de-ionized water passes through a dense filter 912 disposed on the bottom of the vial. The polyimide sheet 886 is retained within the vessel 896 because the tapered opening 898 of the vessel is smaller than the sheet. Referring to FIG. 19, another filter 914 is place in the vial 910 to secure the microbeads therein for storage.

Figure 20:
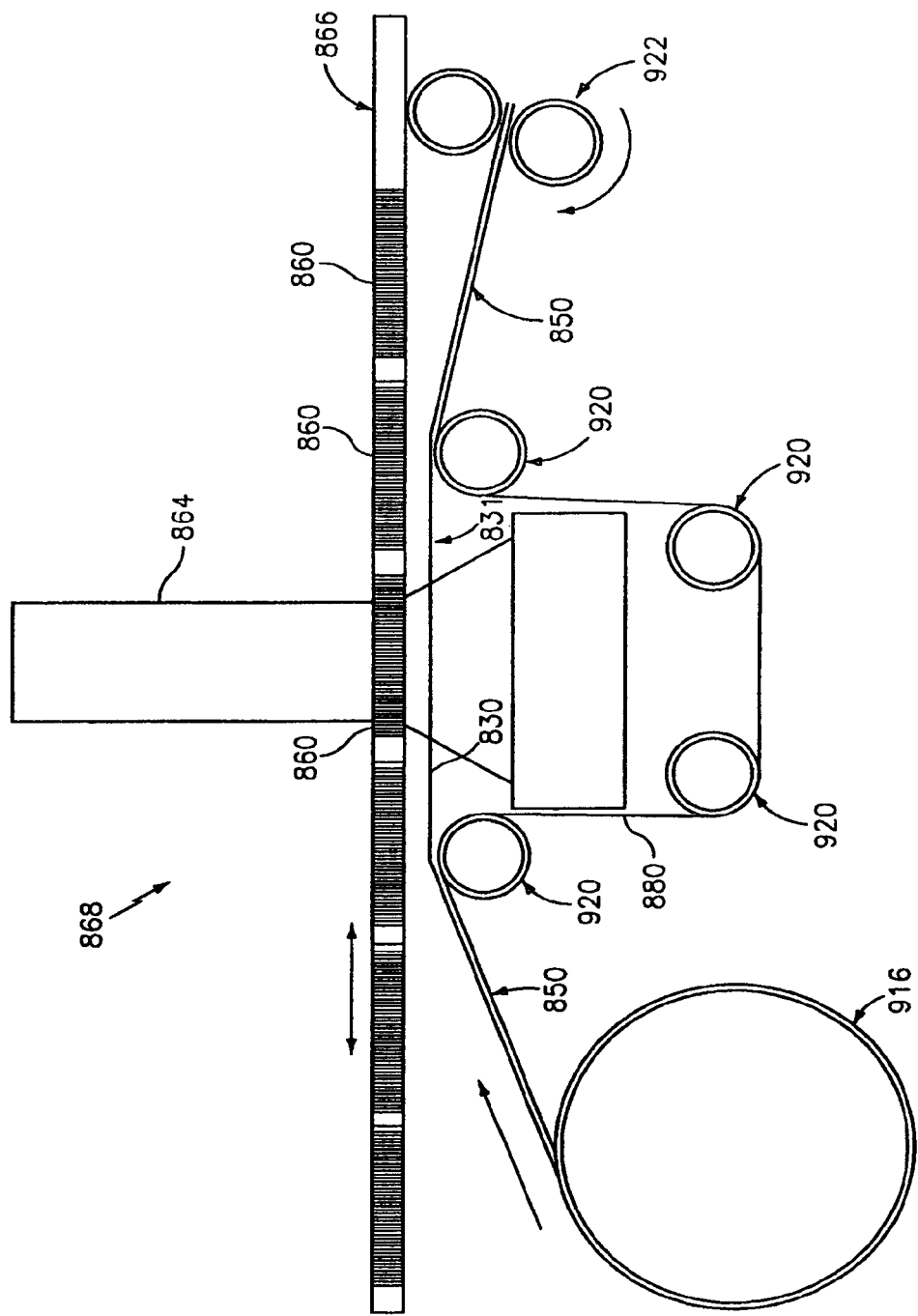
FIG. 20 is a top view of another embodiment of a grating writing station, in accordance with the present invention.
Figure 21:
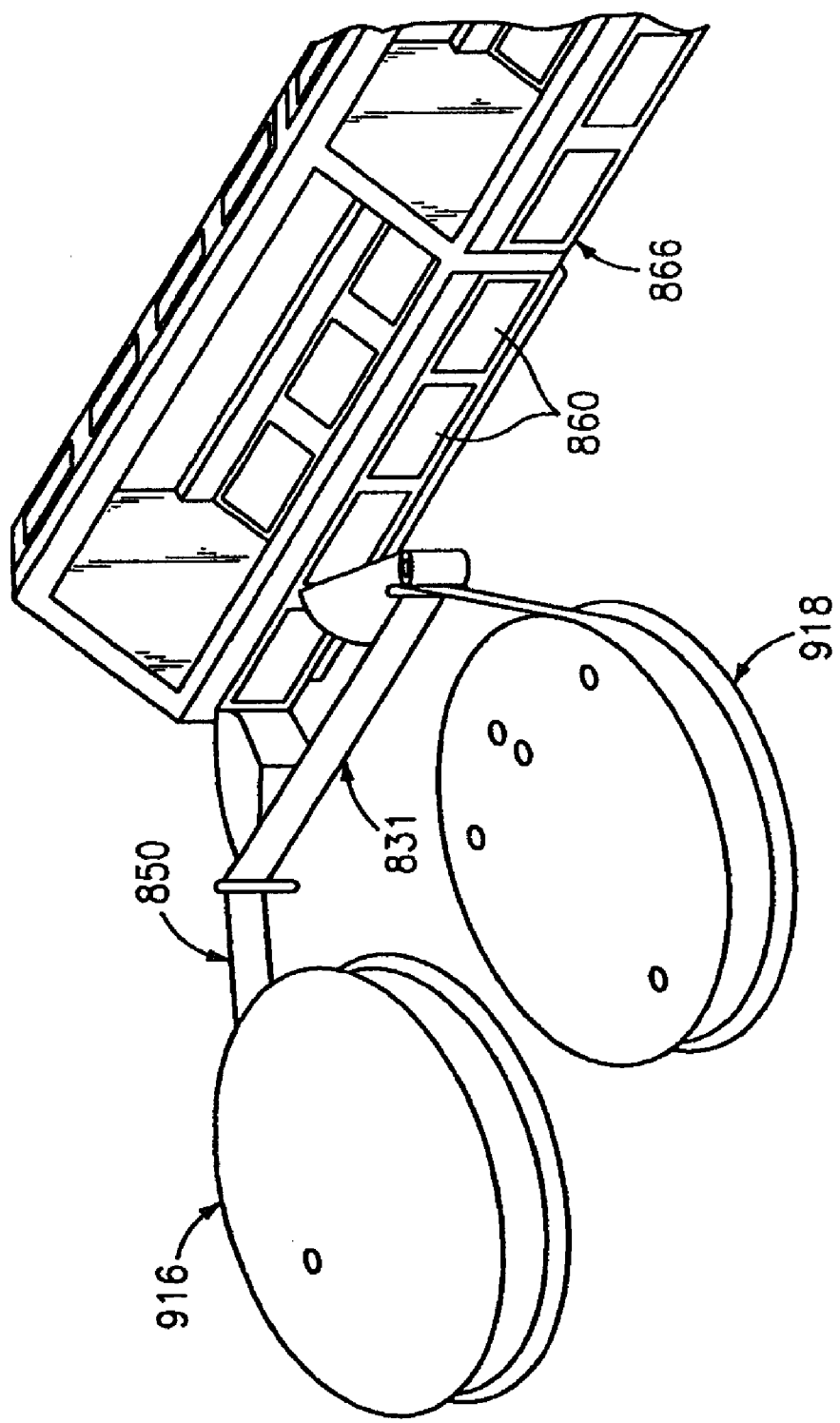
FIG. 21 is a perspective view of another embodiment of a grating writing station, in accordance with the present invention.

FIGS. 20 and 21 illustrate a method of writing at least one grating 12 in a section 831 of a fiber ribbon 850. In this embodiment the fiber ribbon, similar to that described hereinbefore, is wound around a spool 916. The fiber ribbon is drawn through a grating writing station 868 to a take up spool 918. The grating writing station 868 includes a carriage 866 having a plurality of phase masks 860 that linearly translates parallel to the flat section 831 of the fiber ribbon 850. The carriage translates to position the desired phase mask in position to write the proper grating 12. As the fiber ribbon is fed to the grating writing station 868, a set of rollers 920 separate the tape 880 from the fibers 830 and directs the tape away from the ultraviolet (UV) beam 864 to thereby protect the tape from the UV beam. The rollers direct the tape and fibers back together and a pair pinch rollers 922 adhere the fibers 830 back onto the tape 880 to form the fiber ribbon 850. In the operation of the writing station 868, each section 831 of ribbon 850 is sequentially positioned in the writing station. When a section of ribbon is positioned in the writing station, the carriage 866 translates to position a desired phase mask 860 between the laser 862 and the fibers 830. The laser then provides the UV beam to write the grating 12 in the fibers 830. The carriage 866 then translates to position another phase mask to write a second grating onto the section 831 of fibers 830. This operation continues until all the desired gratings are written. The second spool 918 then draws the next section of fibers 830 into the writing station to write the desired grating (s) into the fibers. The grating(s) written into each section of fibers may be the same or different.

Figure 22:
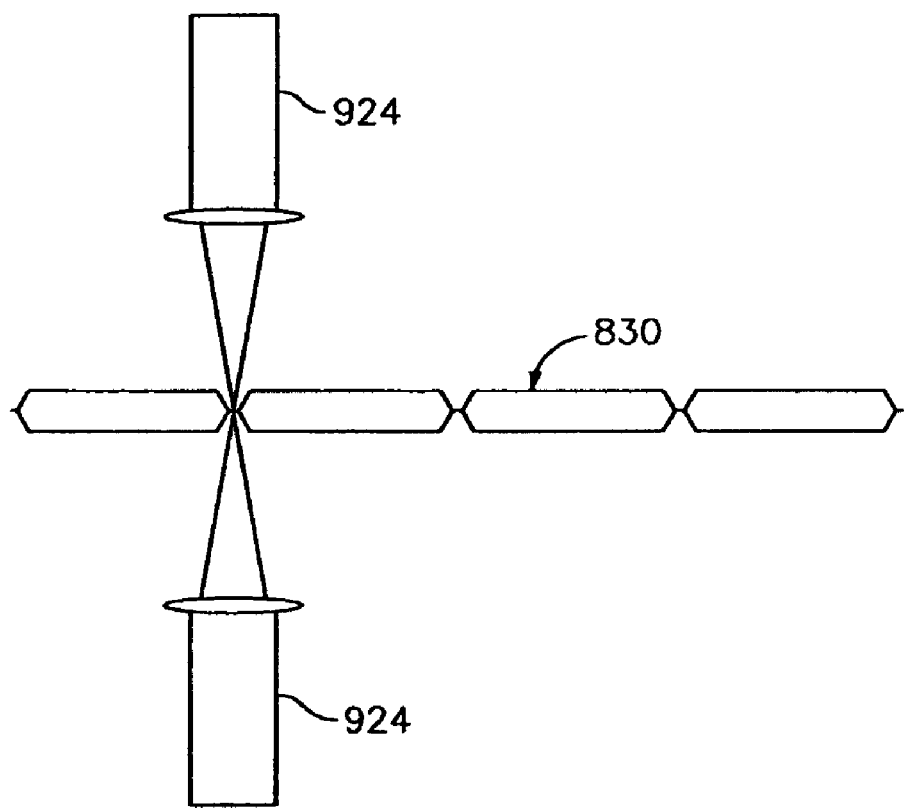
FIG. 22 is a side view of a pair of lasers scoring opposing sides of a fiber to form microbeads, in accordance with the present invention.
Figure 23:
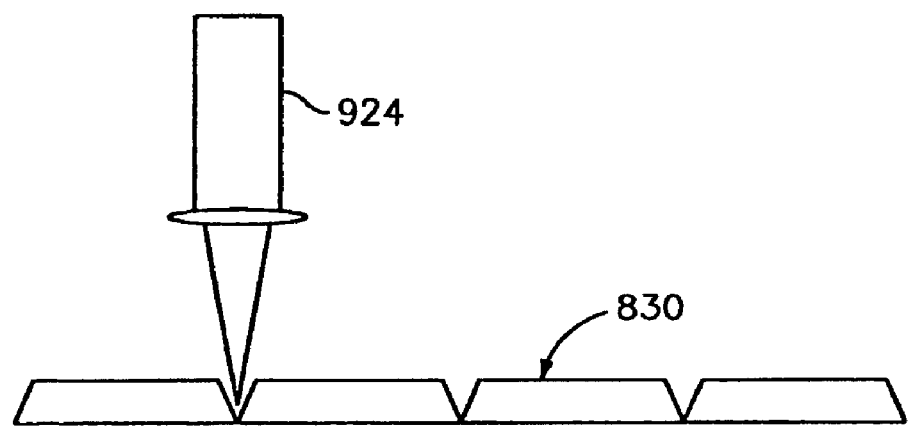
FIG. 23 is a side view of a laser scoring one side of a fiber to form microbeads, in accordance with the present invention.
Figure 24:
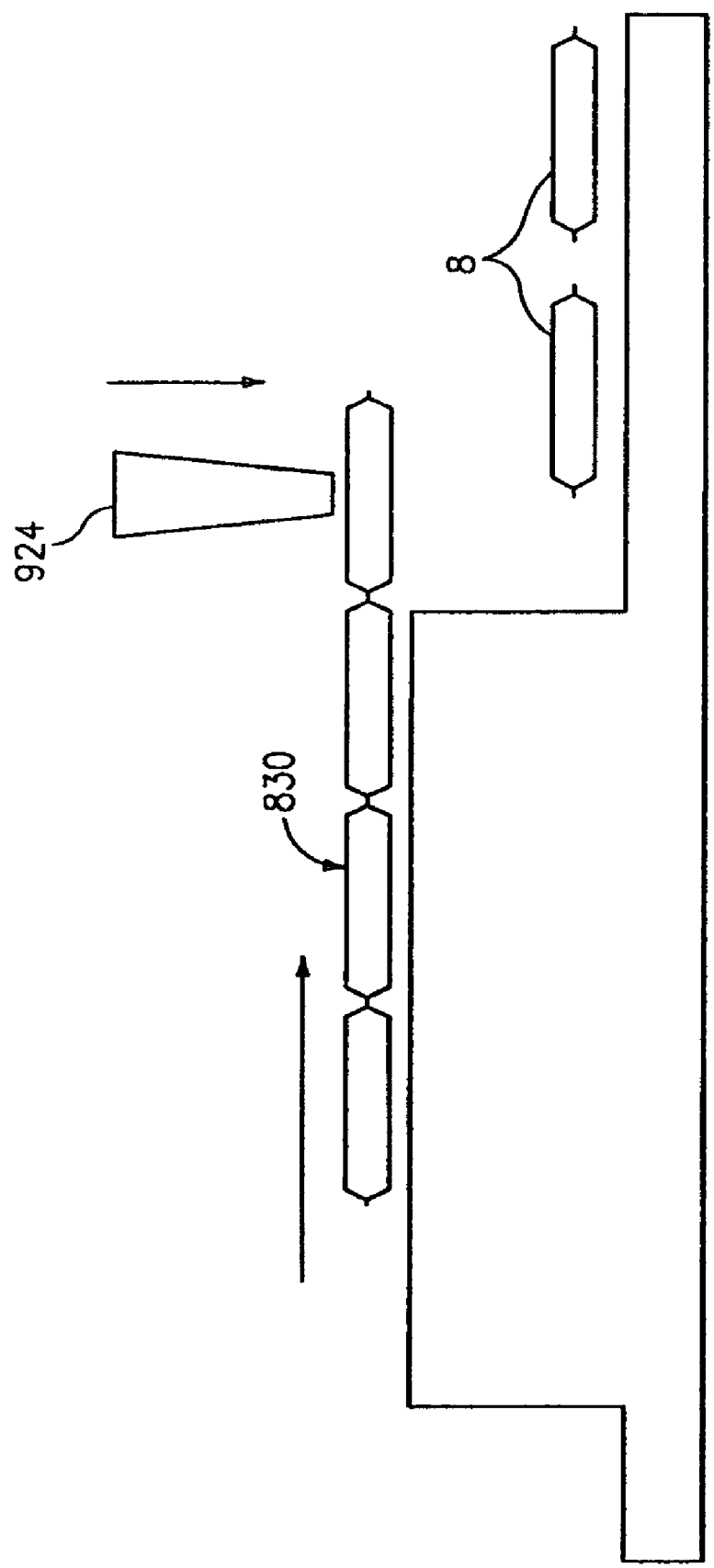
FIG. 24 is a side view of an anvil and support used to separate the microbeads from the scored fiber, in accordance with the present invention.

Referring to FIGS. 22 and 23, the present invention contemplates cutting/dicing the fibers 830 using a laser 924 (e.g., $CO_2$ laser or excimer laser). In one embodiment the laser 924 may be used to completely cut through the fibers 830. Alternatively, the laser can be used to score the fibers as shown in FIGS. 22 and 23. In FIG. 22, two lasers 924 are used to score both sides of the fibers 830 at the same location, while in FIG. 23, one laser 924 is used to score only one side of the fibers. Once scored, the fibers 830 may be separated to form the microbeads 8 by placing the scored fibers 830 in an ultrasonic bath (at 49 KHz) to vibrate the microbeads 8 apart. Alternatively, as shown in FIG. 24 the microbeads 8 may be separated using a mechanical anvil 928 that snaps or breaks each microbead 8 from the scored fiber 830.

Figure 25:
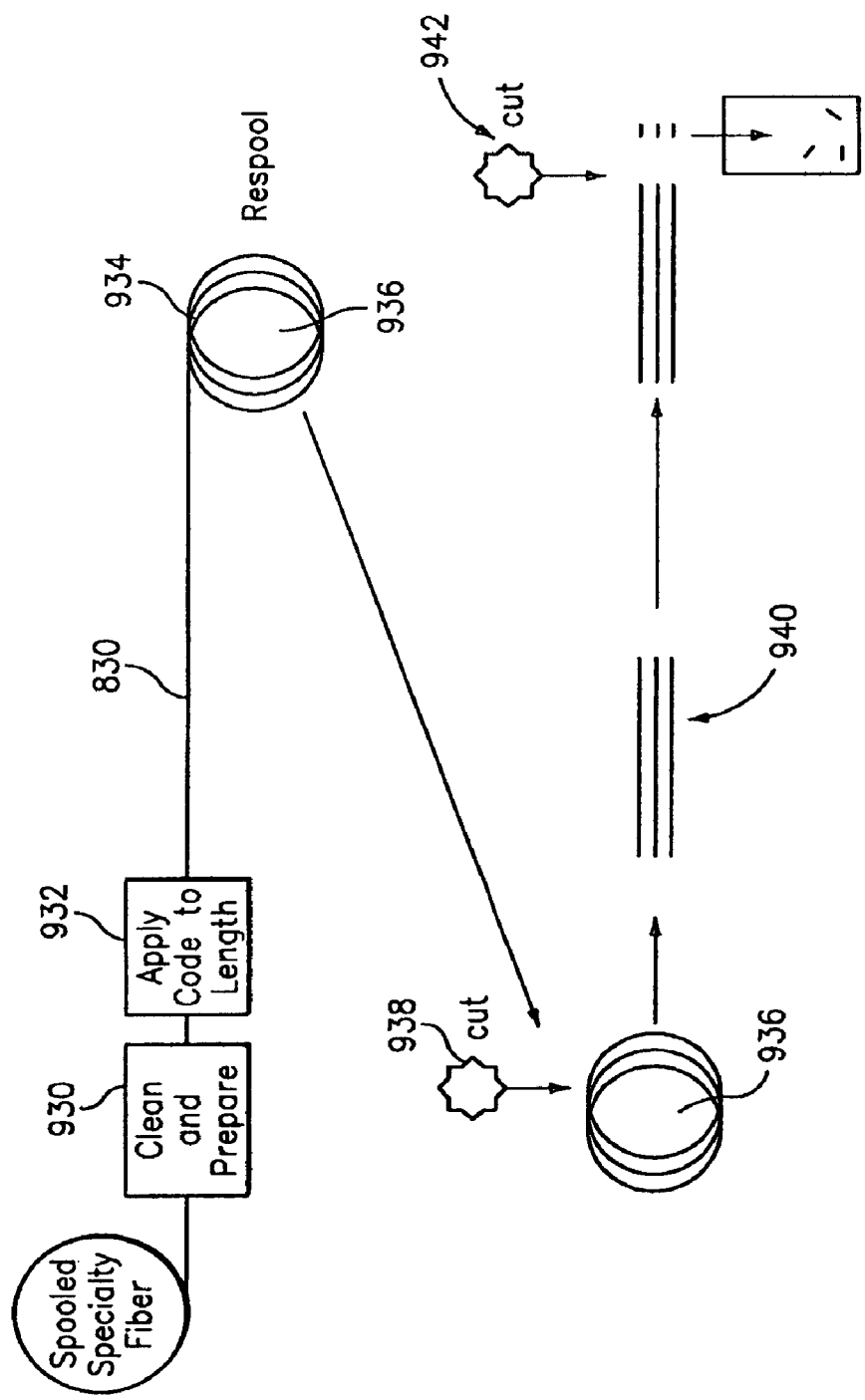
FIG. 25 is a schematic illustration of another method of manufacturing microbeads, in accordance with the present invention.

FIG. 25 is a schematic illustration of an alternative method of manufacturing the microbeads 8. As shown, the photosensitive fiber 830 is first stripped and cleaned 930. The gratings 12 are then written into the fiber 932 and then wound 934 onto a second a spool 936. The fiber 830 is then cut off 938 the spool 936 in a plurality of strips 940 of fiber that are flattened out. The strips of fibers are then cut or diced with a blade 942.

If the microbeads 8 should be used to perform a chemical experiment or assay similar to that described in U.S. patent application Ser. No. 10/661,031 and U.S. patent application Ser. No. 10/661,115, both filed contemporaneously, which are incorporated herein by reference, the probe compound or chemical may be coated or applied to the fiber or microbeads at any step in the process of manufacture of the microbeads described hereinbefore.

Figure 26:
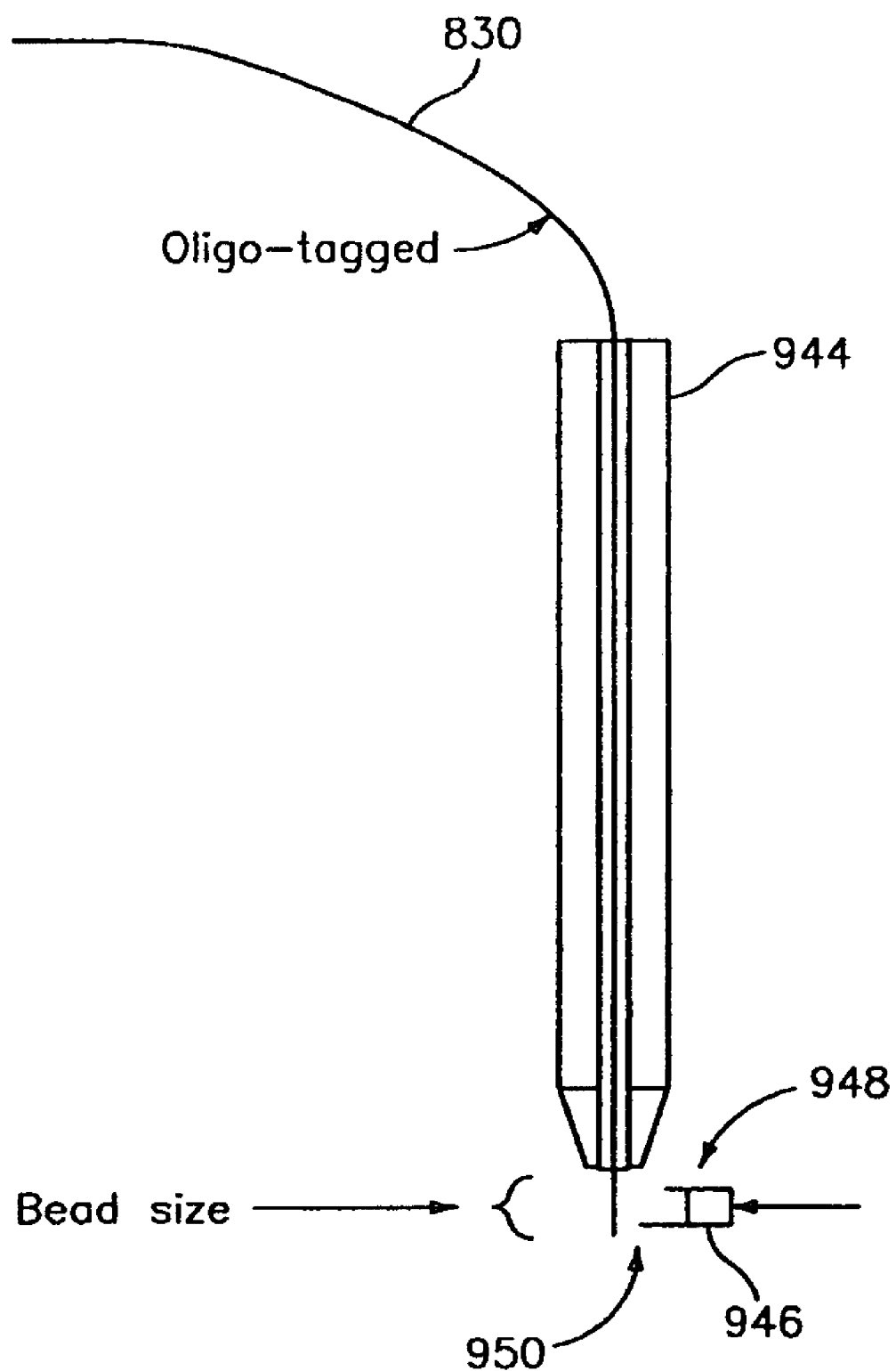
FIG. 26 is a side view of another embodiment for cutting a fiber to form microbeads, in accordance with the present invention.

FIG. 26 illustrates another method of cutting dicing the fibers 830 to form the microbeads 8. As shown, after the grating(s) 12 have been written into the fiber (and in this particle instance, coated/tagged with a probe compound (e.g., Oligo), the fiber 830 is fed into a tubular fiber holder 944. As the fiber is pushed through the holder 944, a cutting device 946 having a blade 948 cuts or scores the fiber 830 to the appropriate length, which is then separates the microbead from the fiber by a torque element 950.

Figure 27:
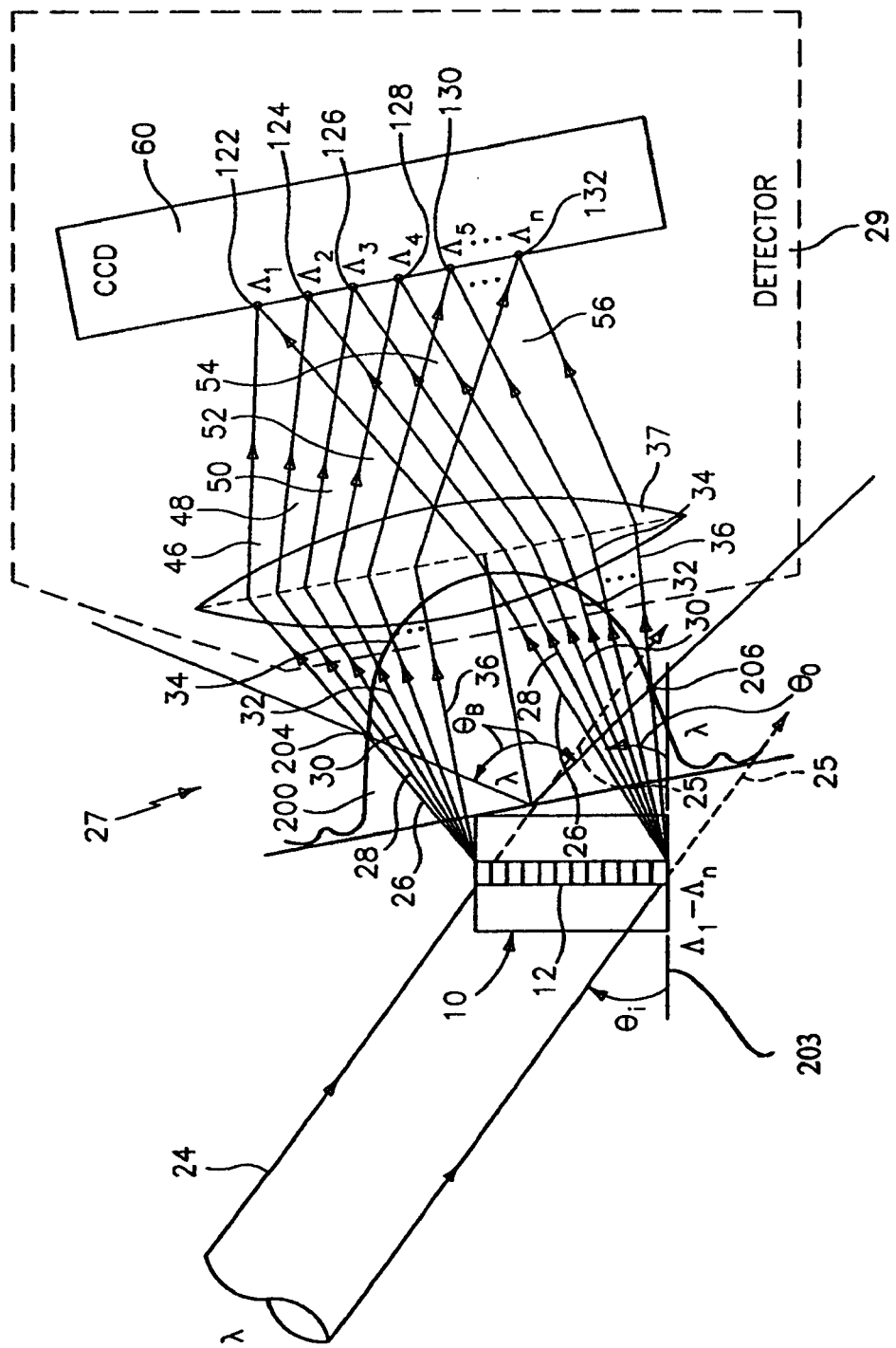
FIG. 27 is an optical schematic for reading a code in an optical identification element, in accordance with the present invention.

Referring to FIG. 27, the reflected light 27, comprises a plurality of beams 26-36 that pass through a lens 37, which provides focused light beams 46-56, respectively, which are imaged onto a CCD camera 60. The lens 37 and the camera 60, and any other necessary electronics or optics for performing the functions described herein, make up the reader 29. Instead of or in addition to the lens 37, other imaging optics may be used provide the desired characteristics of the optical image/signal onto the camera 60 (e.g., spots, lines, circles, ovals, etc.), depending on the shape of the substrate 10 and input optical signals. Also, instead of a CCD camera other devices may be used to read/capture the output light.

Figure 28:
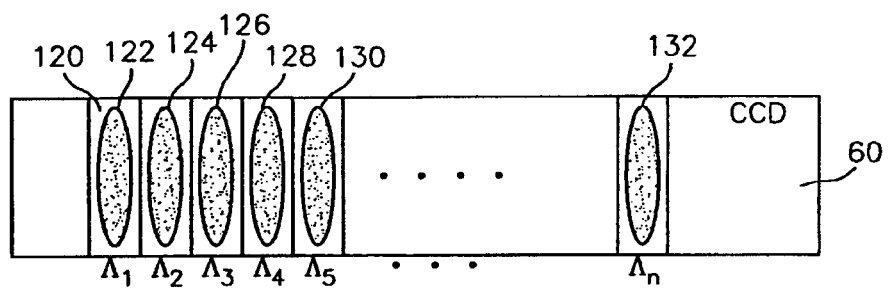
FIG. 28 is an image of a code on a CCD camera from an optical identification element, in accordance with the present invention.

Referring to FIG. 28, the image on the CCD camera 60 is a series of illuminated stripes indicating ones and zeros of a digital pattern or code of the grating 12 in the element 8.

Figure 29:
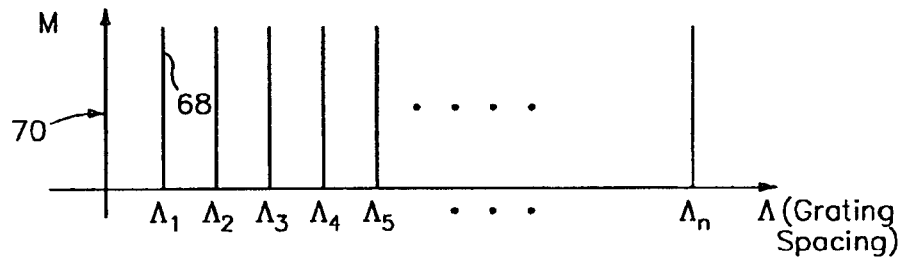
FIG. 29 is a graph showing an digital representation of bits in a code in an optical identification element, in accordance with the present invention.

Referring to FIG. 29, lines 68 on a graph 70 are indicative of a digitized version of the image of FIG. 28 as indicated in spatial periods ($\Lambda 1$-$\Lambda n$).

Each of the individual spatial periods ($\Lambda 1$-$\Lambda n$) in the grating 12 is slightly different, thus producing an array of N unique diffraction conditions (or diffraction angles) discussed more hereinafter. When the element 8 is illuminated from the side, in the region of the grating 12, at an appropriate input angle, e.g., about 30 degrees, with a single input wavelength $\lambda$ (monochromatic) source, the diffracted (or reflected) beams 26-36 are generated. Other input angles $\theta i$ may be used if desired, depending on various design parameters as discussed herein and/or in the aforementioned patent application, and provided that a known diffraction equation (Eq. 1 below) is satisfied:

$$\sin(\theta_i)+\sin(\theta_o)=m\lambda/n\Lambda \quad \text{Eq. 1}$$

where Eq. 1 is diffraction (or reflection or scatter) relationship between input wavelength $\lambda$, input incident angle $\theta i$, output incident angle $\theta o$, and the spatial period $\Lambda$ of the grating 12. Further, m is the "order" of the reflection being observed, and n is the refractive index of the substrate 10. The value of m=1 or first order reflection is acceptable for illustrative purposes. Eq. 1 applies to light incident on outer surfaces of the substrate 10 which are parallel to the longitudinal axis of the grating (or the $k_B$ vector). Because the angles $\theta i, \theta o$ are defined outside the substrate 10 and because the effective refractive index of the substrate 10 is substantially a common value, the value of n in Eq. 1 cancels out of this equation.

Thus, for a given input wavelength $\lambda$, grating spacing $\Lambda$, and incident angle of the input light $\theta i$, the angle $\theta o$ of the reflected output light may be determined. Solving Eq. 1 for $\theta o$ and plugging in m=1, gives:

$$\theta o = \sin^{-1}(\lambda/\Lambda - \sin(\theta i)) \quad \text{Eq. 2}$$

For example, for an input wavelength $\lambda$=532 nm, a grating spacing $\Lambda$=0.532 microns (or 532 nm), and an input angle of incidence $\theta i$=30 degrees, the output angle of reflection will be $\theta o$=30 degrees. Alternatively, for an input wavelength $\lambda$=632 nm, a grating spacing $\Lambda$=0.532 microns (or 532 nm), and an input angle $\theta i$ of 30 degrees, the output angle of reflection $\theta o$ will be at 43.47 degrees, or for an input angle $\theta i$=37 degrees, the output angle of reflection will be $\theta o$=37 degrees. Any input angle that satisfies the design requirements discussed herein and/or in the aforementioned patent application may be used.

In addition, to have sufficient optical output power and signal to noise ratio, the output light 27 should fall within an acceptable portion of the Bragg envelope (or normalized reflection efficiency envelope) curve 200, as indicated by points 204,206, also defined as a Bragg envelope angle $\theta B$, as also discussed herein and/or in the aforementioned patent application. The curve 200 may be defined as:

$$I(ki, ko) \approx [KD]^2 \sin c^2\left[\frac{(ki-ko)D}{2}\right] \quad \text{Eq. 3}$$

where $K=2\pi\delta n/\lambda$, where, $\delta n$ is the local refractive index modulation amplitude of the grating and $\lambda$ is the input wavelength, $\sin c(x)=\sin(x)/x$, and the vectors $k_i=2\pi \cos(\theta_i)/\lambda$ and $k_o=2\pi \cos(\theta_o)/\lambda$ are the projections of the incident light and the output (or reflected) light, respectively, onto the line 203 normal to the axial direction of the grating 12 (or the grating vector $k_B$), D is the thickness or depth of the grating 12 as measured along the line 203 (normal to the axial direction of the grating 12). Other substrate shapes than a cylinder may be used and will exhibit a similar peaked characteristic of the Bragg envelope. We have found that a value for $\delta n$ of about $10^{-4}$ in the grating region of the substrate is acceptable; however, other values may be used if desired.

Rewriting Eq. 3 gives the reflection efficiency profile of the Bragg envelope as:

$$I(ki, ko) \approx \left[\frac{2\pi \cdot \delta n \cdot D}{\lambda}\right]^2 \left[\frac{\sin(x)}{x}\right]^2 \quad \text{Eq. 4}$$

where:

$$x=(ki-ko)D/2=(\pi D/\lambda)*(\cos \theta i-\cos \theta o)$$

Thus, when the input angle $\theta i$ is equal to the output (or reflected) angle $\theta_o$ (i.e., $\theta i=\theta_o$), the reflection efficiency I (Eqs. 3 & 4) is maximized which is at the center or peak of the Bragg envelope. When $\theta i=\theta o$, the input light angle is referred to as the Bragg angle as is known. The efficiency decreases for other input and output angles (i.e., $\theta i \neq \theta_o$), as defined by Eqs. 3 & 4. Thus, for maximum reflection efficiency and thus output light power, for a given grating pitch $\Lambda$ and input wavelength, the angle $\theta i$ of the input light 24 should be set so that the angle $\theta o$ of the reflected output light equals the input angle $\theta i$.

Also, as the thickness or diameter D of the grating decreases, the width of the $\sin(x)/x$ function (and thus the width of the Bragg envelope) increases and, the coefficient to or amplitude of the $\sin c^2$ (or $(\sin(x)/x)^2$ function (and thus the efficiency level across the Bragg envelope) also increases, and vice versa. Further, as the wavelength $\lambda$ increases, the half-width of the Bragg envelope as well as the efficiency level across the Bragg envelope both decrease. Thus, there is a trade-off between the brightness of an individual bit and the number of bits available under the Bragg envelope. Ideally, $\delta n$ should be made as large as possible to maximize the brightness, which allows D to be made smaller.

From Eq. 3 and 4, the half-angle of the Bragg envelope $\theta_B$ is defined as:

$$\theta_B = \frac{\eta\lambda}{\pi D \sin(\theta_i)} \quad \text{Eq. 5}$$

where $\eta$ is a reflection efficiency factor which is the value for x in the $\sin c^2(x)$ function where the value of $\sin c^2(x)$ has decreased to a predetermined value from the maximum amplitude as indicated by points 204,206 on the curve 200.

We have found that the reflection efficiency is acceptable when $\eta \leq 1.39$. This value for $\eta$ corresponds to when the amplitude of the reflected beam (i.e., from the $\sin c^2(x)$ function of Eqs. 3 & 4) has decayed to about 50% of its peak value. In particular, when x=1.39=$\eta$, $\sin c^2(x)$=0.5. However, other values for efficiency thresholds or factor in the Bragg envelope may be used if desired.

The beams 26-36 are imaged onto the CCD camera 60 to produce the pattern of light and dark regions 120-132 representing a digital (or binary) code, where light=1 and dark=0 (or vice versa). The digital code may be generated by selectively creating individual index variations (or individual gratings) with the desired spatial periods $\Lambda 1$-$\Lambda n$. Other illumination, readout techniques, types of gratings, geometries, materials, etc. may be used as discussed in the aforementioned patent application.

Figure 30:
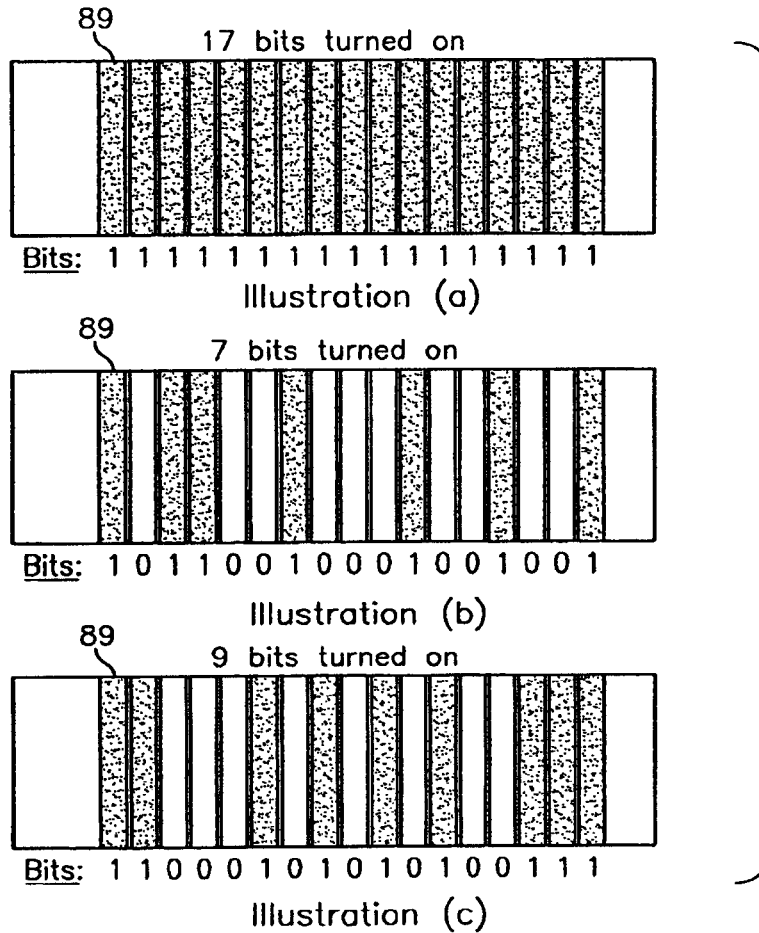
FIG. 30 illustrations (a)-(c) shown images of digital codes on a CCD camera, in accordance with the present invention.

Referring to FIG. 30, illustrations (a)-(c), for the grating 12 in a cylindrical substrate 10 having a sample spectral 17 bit code (i.e., 17 different pitches Λ1-Λ17), the corresponding image on the CCD (Charge Coupled Device) camera 60 is shown for a digital pattern 17 bit locations 89, including FIG. 30 illustrations (b), (c) and (d), respectively, of 7 bits turned on (10110010001001001); 9 bits turned on of (11000101010100111); and all 17 bits turned on of (11111111111111111).

For the images in FIG. 30, the length of the substrate 10 was 450 microns, the outer diameter D1 was 65 microns, the inner diameter D was 14 microns, δn for the grating 12 was about $10^{-4}$, n1 in portion 20 was about 1.458 (at a wavelength of about 1550 nm), n2 in portion 18 was about 1.453, the average pitch spacing Λ for the grating 12 was about 0.542 microns, and the spacing between pitches ΔΛ was about 0.36% of the adjacent pitches Λ.

Figure 31:
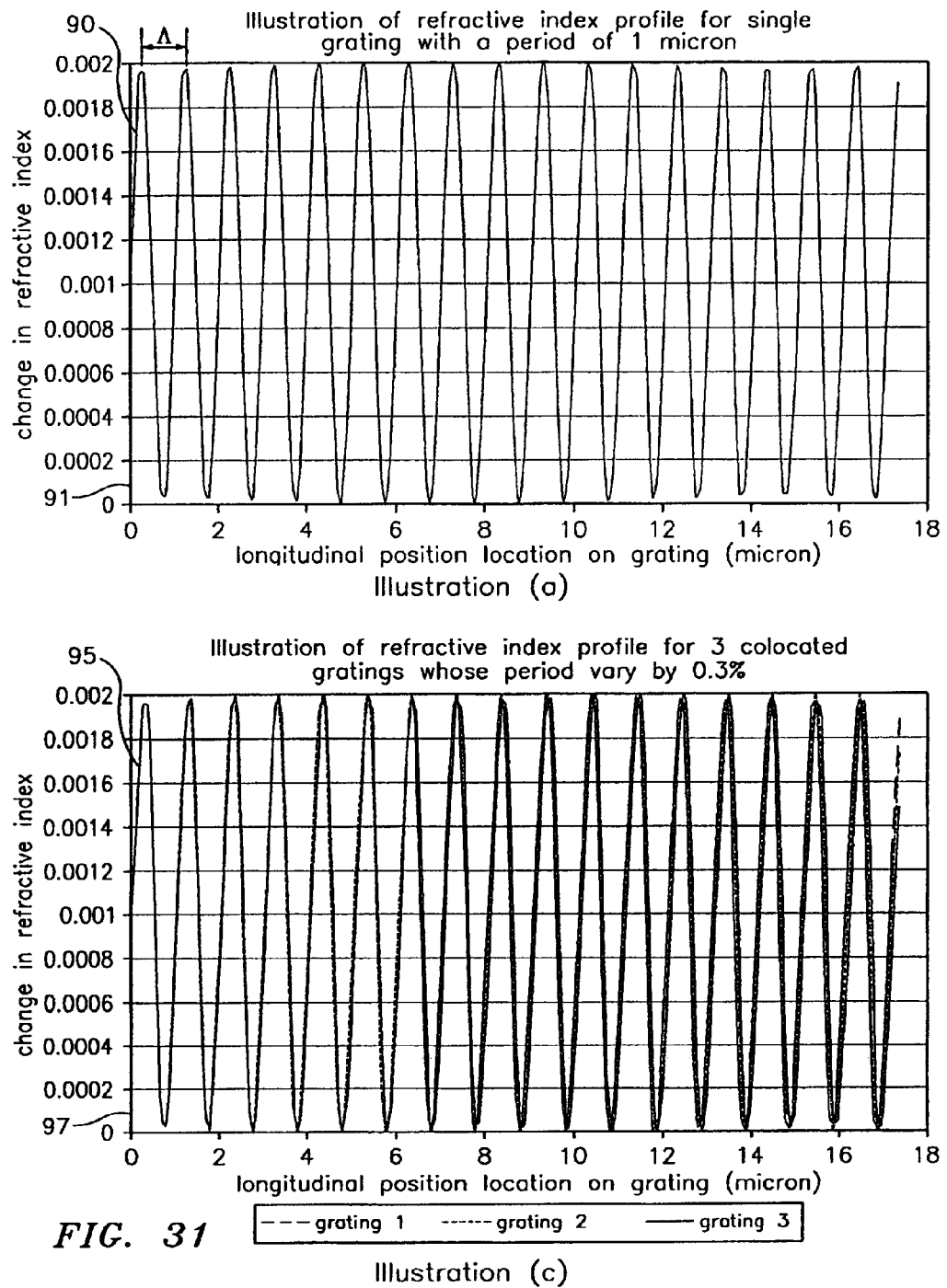
FIG. 31 illustrations (a)-(d) show graphs of different refractive index pitches and a summation graph, in accordance with the present invention.

Referring to FIG. 31 illustration (a), the pitch Λ of an individual grating is the axial spatial period of the sinusoidal variation in the refractive index n1 in the region of the substrate 10 along the axial length of the grating 12 as indicated by a curve 90 on a graph 91. Referring to FIG. 31, illustration (b), a sample composite grating 12 comprises three individual gratings that are co-located on the substrate 10, each individual grating having slightly different pitches, Λ1, Λ2, Λ3, respectively, and the difference (or spacing) ΔΛ between each pitch Λ being about 3.0% of the period of an adjacent pitch Λ as indicated by a series of curves 92 on a graph 94. Referring to FIG. 31 illustration (c), three individual gratings, each having slightly different pitches, Λ1, Λ2, Λ3, respectively, are shown, the difference ΔΛ between each pitch Λ being about 0.3% of the pitch Λ of the adjacent pitch as shown by a series of curves 95 on a graph 97. The individual gratings in FIG. 31, illustrations (b) and (c) are shown to all start at 0 for illustration purposes however, it should be understood that, the separate gratings need not all start in phase with each other. Referring to FIG. 31, illustration (d), the overlapping of the individual sinusoidal refractive index variation pitches Λ1-Λn in the grating region 20 of the substrate 10, produces a combined resultant refractive index variation in the composite grating 12 shown as a curve 96 on a graph 98 representing the combination of the three pitches shown in FIG. 31, illustration (b). Accordingly, the resultant refractive index variation in the grating region 20 of the substrate 10 may not be sinusoidal and is a combination of the individual pitches Λ (or index variation).

The maximum number of resolvable bits N, which is equal to the number of different grating pitches Λ (and hence the number of codes), that can be accurately read (or resolved) using side-illumination and side-reading of the grating 12 in the substrate 10, is determined by numerous factors, including: the beam width w incident on the substrate (and the corresponding substrate length L and grating length Lg), the thickness or diameter D of the grating 12, the wavelength λ of incident light, the beam divergence angle $θ_R$, and the width of the Bragg envelope $θ_B$ (discussed more in the aforementioned patent application), and may be determined by the equation:

$$N \cong \frac{\eta \beta L}{2D\sin(\theta_i)}$$ Eq. 6

Figure 32:
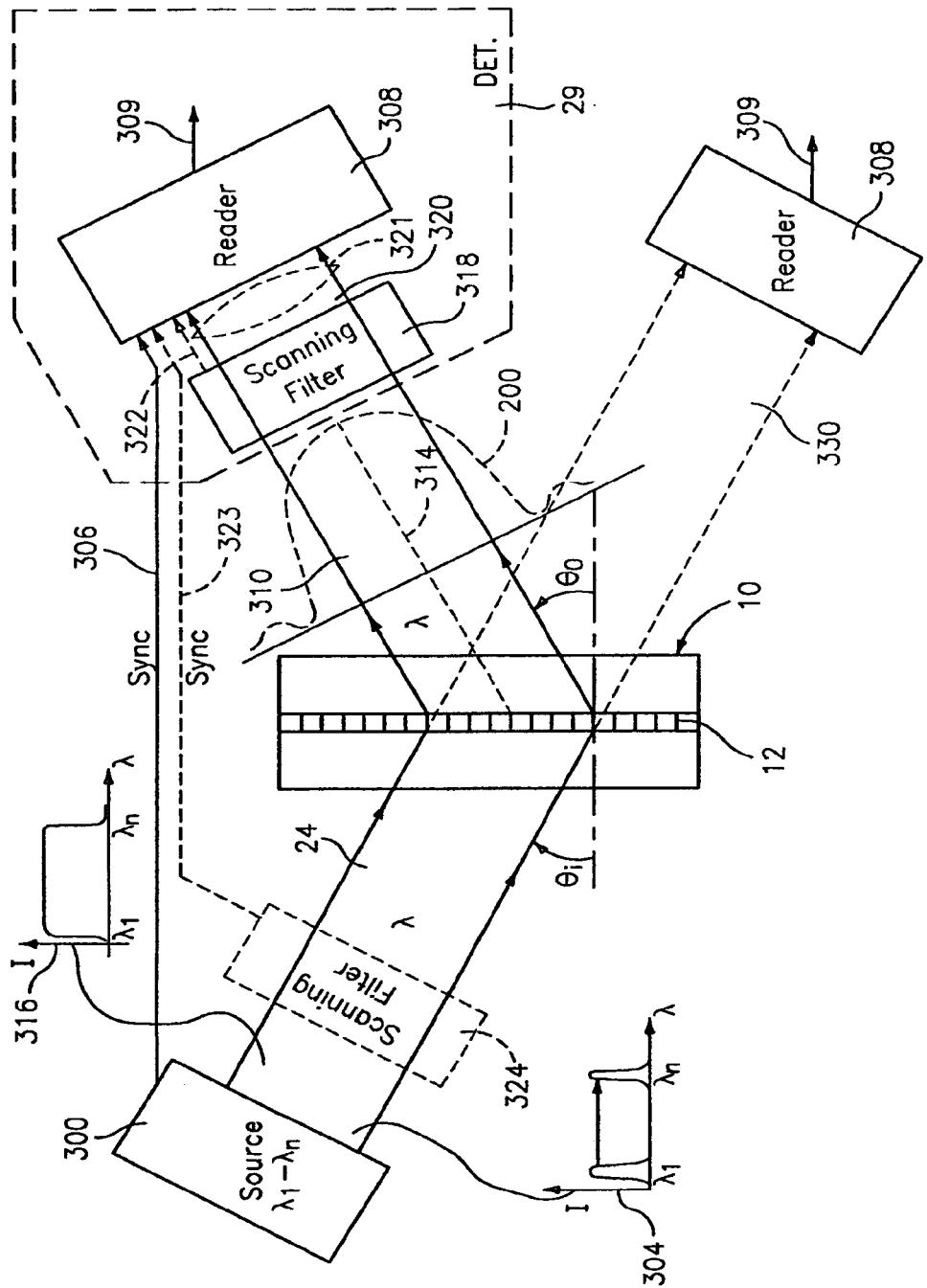
FIG. 32 is an alternative optical schematic for reading a code in an optical identification element, in accordance with the present invention.

Referring to FIG. 32, instead of having the input light 24 at a single wavelength λ (monochromatic) and reading the bits by the angle θo of the output light, the bits (or grating pitches Λ) may be read/detected by providing a plurality of wavelengths and reading the wavelength spectrum of the reflected output light signal. In this case, there would be one bit per wavelength, and thus, the code is contained in the wavelength information of the reflected output signal.

In this case, each bit (or Λ) is defined by whether its corresponding wavelength falls within the Bragg envelope, not by its angular position within the Bragg envelope 200. As a result, it is not limited by the number of angles that can fit in the Bragg envelope 200 for a given composite grating 12, as in the embodiment discussed hereinbefore. Thus, using multiple wavelengths, the only limitation in the number of bits N is the maximum number of grating pitches Λ that can be superimposed and optically distinguished in wavelength space for the output beam.

Figure 33:
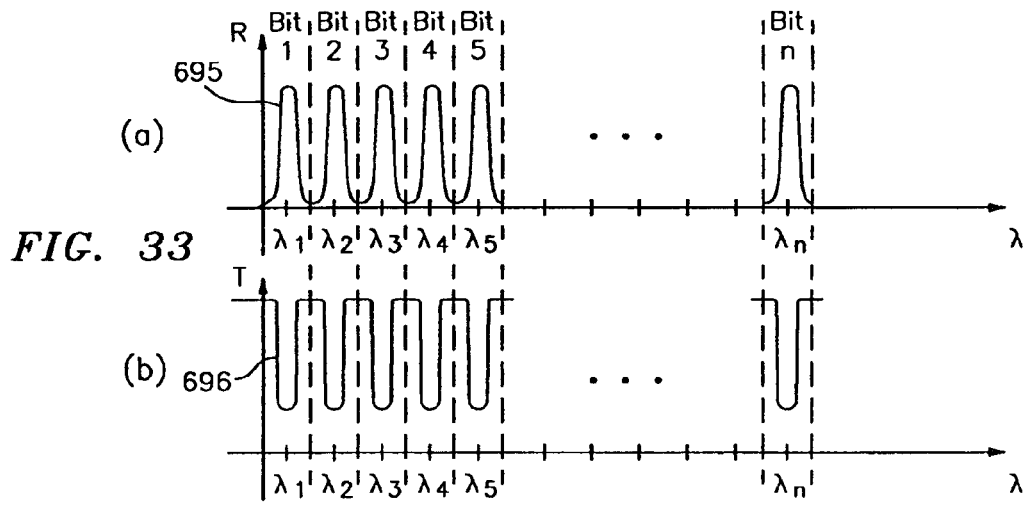
FIG. 33 illustrations (a)-(b) are graphs of reflection and transmission wavelength spectrum for an optical identification element, in accordance with the present invention.

Referring to FIGS. 32 and 33, illustration (a), the reflection wavelength spectrum (λ1-λn) of the reflected output beam 310 will exhibit a series of reflection peaks 695, each appearing at the same output Bragg angle θo. Each wavelength peak 695 (λ1-λn) corresponds to an associated spatial period (Λ1-Λn), which make up the grating 12.

One way to measure the bits in wavelength space is to have the input light angle θi equal to the output light angle θo, which is kept at a constant value, and to provide an input wavelength λ that satisfies the diffraction condition (Eq. 1) for each grating pitch Λ. This will maximize the optical power of the output signal for each pitch Λ detected in the grating 12.

Referring to 33, illustration (b), the transmission wavelength spectrum of the transmitted output beam 330 (which is transmitted straight through the grating 12) will exhibit a series of notches (or dark spots) 696. Alternatively, instead of detecting the reflected output light 310, the transmitted light 330 may be detected at the detector/reader 308. It should be understood that the optical signal levels for the reflection peaks 695 and transmission notches 696 will depend on the "strength" of the grating 12, i.e., the magnitude of the index variation n in the grating 12.

In FIG. 32, the bits may be detected by continuously scanning the input wavelength. A known optical source 300 provides the input light signal 24 of a coherent scanned wavelength input light shown as a graph 304. The source 300 provides a sync signal on a line 306 to a known reader 308. The sync signal may be a timed pulse or a voltage ramped signal, which is indicative of the wavelength being provided as the input light 24 to the substrate 10 at any given time. The reader 308 may be a photodiode, CCD camera, or other optical detection device that detects when an optical signal is present and provides an output signal on a line 309 indicative of the code in the substrate 10 or of the wavelengths present in the output light, which is directly related to the code, as discussed herein. The grating 12 reflects the input light 24 and provides an output light signal 310 to the reader 308. The wavelength of the input signal is set such that the reflected output light 310 through an optical lens 321 will be substantially in the center 314 of the Bragg envelope 200 for the individual grating pitch (or bit) being read.

Alternatively, the source 300 may provide a continuous broadband wavelength input signal such as that shown as a graph 316. In that case, the reflected output beam 310 signal is provided to a narrow band scanning filter 318 which scans across the desired range of wavelengths and provides a filtered output optical signal 320 to the reader 308. The filter 318 provides a sync signal on a line 322 to the reader, which is indicative of which wavelengths are being provided on the output signal 320 to the reader and may be similar to the sync signal discussed hereinbefore on the line 306 from the source 300. In this case, the source 300 does not need to provide a sync signal because the input optical signal 24 is continuous.

Alternatively, instead of having the scanning filter being located in the path of the output beam 310, the scanning filter may be located in the path of the input beam 24 as indicated by the dashed box 324, which provides the sync signal on a line 323.

Alternatively, instead of the scanning filters 318,324, the reader 308 may be a known optical spectrometer (such as a known spectrum analyzer), capable of measuring the wavelength of the output light.

The desired values for the input wavelengths λ (or wavelength range) for the input signal 24 from the source 300 may be determined from the Bragg condition of Eq. 1, for a given grating spacing Λ and equal angles for the input light θi and the angle light θo. Solving Eq. 1 for λ and plugging in m=1, gives:

$$\lambda = \Lambda[\sin(\theta o) + \sin(\theta i)] \qquad \text{Eq. 7}$$

It is also possible to combine the angular-based code detection with the wavelength-based code detection, both discussed hereinbefore. In this case, each readout wavelength is associated with a predetermined number of bits within the Bragg envelope. Bits (or grating pitches Λ) written for different wavelengths do not show up unless the correct wavelength is used.

Accordingly, the bits (or grating pitches Λ) can be read using one wavelength and many angles, many wavelengths and one angle, or many wavelengths and many angles.

Figure 34:
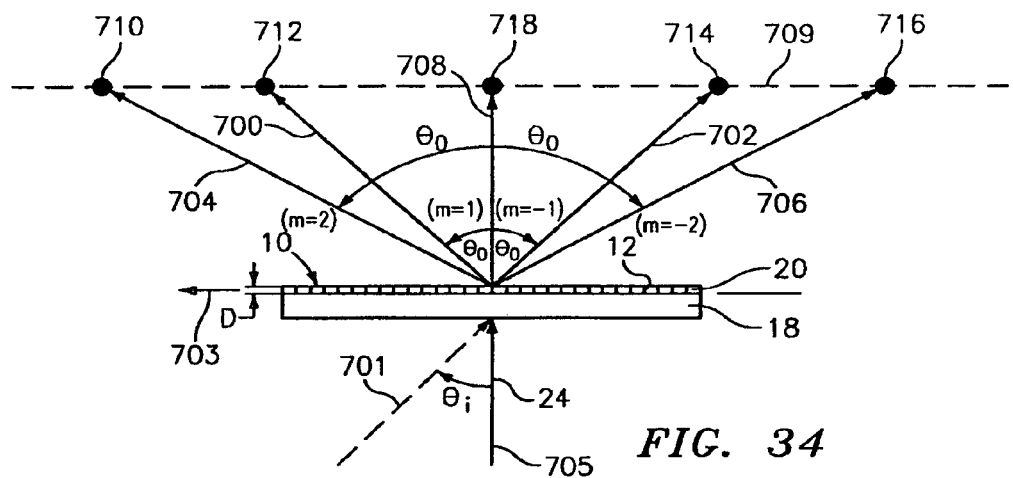
FIGS. 34-35 are side views of a thin grating for an optical identification element, in accordance with the present invention.

Referring to FIG. 34, the grating 12 may have a thickness or depth D which is comparable or smaller than the incident beam wavelength λ. This is known as a "thin" diffraction grating (or the full angle Bragg envelope is 180 degrees). In that case, the half-angle Bragg envelope θB is substantially 90 degrees however, δn must be made large enough to provide sufficient reflection efficiency per Eqs. 3 and 4. In particular, for a "thin" grating, $D*\delta n \approx \lambda/2$, which corresponds to a π phase shift between adjacent minimum and maximum refractive index values of the grating 12.

It should be understood that there is still a trade-off discussed hereinbefore with beam divergence angle $\theta_R$ and the incident beam width (or length L of the substrate), but the accessible angular space is theoretically now 90 degrees. Also, for maximum efficiency the phase shift between adjacent minimum and maximum refractive index values of the grating 12 should approach a π phase shift however, other phase shifts may be used.

In this case, rather than having the input light 24 coming in at the conventional Bragg input angle θi, as discussed hereinbefore and indicated by a dashed line 701, the grating 12 is illuminated with the input light 24 oriented on a line 705 orthogonal to the longitudinal grating vector 703. The input beam 24 will split into two (or more) beams of equal amplitude, where the exit angle $\theta_o$ can be determined from Eq. 1 with the input angle $\theta_i = 0$ (normal to the longitudinal axis of the grating 12).

In particular, from Eq. 1, for a given grating pitch Λ1, the +/−1$^{st}$ order beams (m=+1 and m=−1) corresponds to output beams 700,702, respectively, the +/−2$^{nd}$ order beams (m=+2 and m=−2) corresponds to output beams 704,706, respectively; and the 0$^{th}$ order (undiffracted) beam (m=0) corresponds to beam 708 and passes straight through the substrate. The output beams 700-708 project spectral spots or peaks 710-718, respectively, along a common plane, shown from the side by a line 709, which is parallel to the upper surface of the substrate 10.

For example, for a grating pitch Λ=1.0 um, and an input wavelength λ=400 nm, the exit angles $\theta_o$ are ~+/−23.6 degrees (for m=+/−1), and +/−53.1 degrees (from m=+/−2), from Eq. 1. It should be understood that for certain wavelengths, certain orders (e.g., m=+/−2) may be reflected back toward the input side or otherwise not detectable at the output side of the grating 12.

Alternatively, one can use only the +/−1$^{st}$ order (m=+/−1) output beams for the code, in which case there would be only 2 peaks to detect, 712, 714. Alternatively, one can also use any one or more pairs from any order output beam that is capable of being detected. Alternatively, instead of using a pair of output peaks for a given order, an individual peak may be used.

Figure 35:
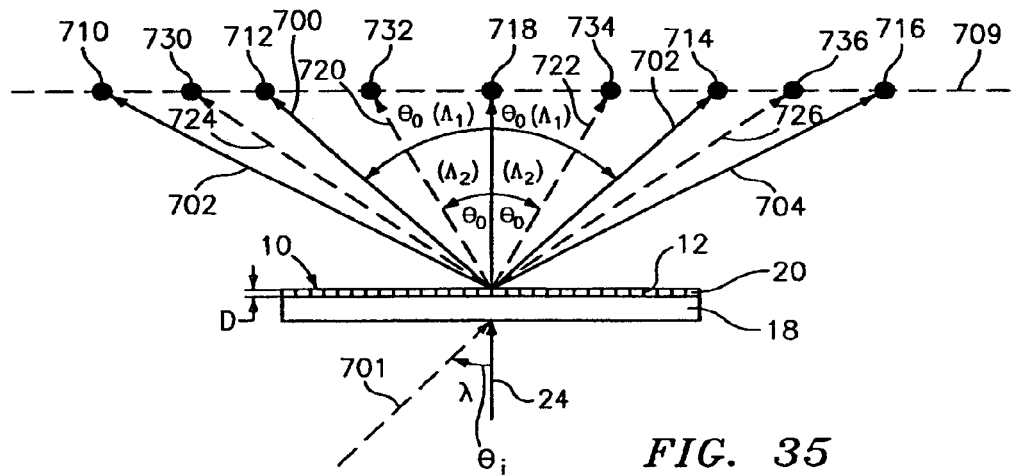

Referring to FIG. 35, if two pitches Λ1,Λ2 exist in the grating 12, two sets of peaks will exist. In particular, for a second grating pitch Λ2, the +/−1$^{st}$ order beams (m=+1 and m=−1) corresponds to output beams 720,722, respectively, the +/−2$^{nd}$ order beams (m=+2 and m=−2) corresponds to output beams 724,726, respectively, and the 0$^{th}$ order (undiffracted) beam (m=0) corresponds to beam 718 and passes straight through the substrate. The output beams 720-726 corresponding to the second pitch Λ2 project spectral spots or peaks 730-736, respectively, which are at a different location than the point 710-716, but along the same common plane, shown from the side by the line 709.

Thus, for a given pitch Λ (or bit) in a grating, a set of spectral peaks will appear at a specific location in space. Thus, each different pitch corresponds to a different elevation or output angle which corresponds to a predetermined set of spectral peaks. Accordingly the presence or absence of a particular peak or set of spectral peaks defines the code.

In general, if the angle of the grating 12 is not properly aligned with respect to the mechanical longitudinal axis of the substrate 10, the readout angles may no longer be symmetric, leading to possible difficulties in readout. With a thin grating, the angular sensitivity to the alignment of the longitudinal axis of the substrate 10 to the input angle θi of incident radiation is reduced or eliminated. In particular, the input light can be oriented along substantially any angle θi with respect to the grating 12 without causing output signal degradation, due the large Bragg angle envelope. Also, if the incident beam 24 is normal to the substrate 10, the grating 12 can be oriented at any rotational (or azimuthal) angle without causing output signal degradation. However, in each of these cases, changing the incident angle θi will affect the output angle θo of the reflected light in a predetermined predictable way, thereby allowing for accurate output code signal detection or compensation.

Referring to FIG. 36, for a thin grating, in addition to multiplexing in the elevation or output angle based on grating pitch Λ, the bits can also be multiplexed in an azimuthal (or rotational) angle θa of the substrate. In particular, a plurality of gratings 750,752,754,756 each having the same pitch Λ are disposed in a surface 701 of the substrate 10 and located in the plane of the substrate surface 701. The input light 24 is incident on all the gratings 750,752,754,756 simultaneously. Each of the gratings provides output beams oriented based on the grating orientation. For example, the grating 750 provides the output beams 764,762, the grating 752 provides the output beams 766,768, the grating 754 provides the output beams 770,772, and the grating 756 provides the output beams 774, 776. Each of the output beams provides spectral peaks or spots (similar to that discussed hereinbefore), which are located in a plane 760 that is parallel to the substrate surface plane 701. In this case, a single grating pitch Λ can produce many bits depending on the number of gratings that can be placed at different azimuthal (rotational) angles on the surface of the substrate 10 and the number of output beam spectral peaks that can be spatially and optically resolved/ detected. Each bit may be viewed as the presence or absence of a pair of peaks located at a predetermined location in space in the plane 760. Note that this example uses only the m=+/−1$^{st}$ order for each reflected output beam. Alternatively, the detection may also use the m=+/−2$^{nd}$ order. In that case, there would be two additional output beams and peaks (not shown) for each grating (as discussed hereinbefore) that may lie in the same plane as the plane 760 and may be on a concentric circle outside the circle 760.

In addition, the azimuthal multiplexing can be combined with the elevation or output angle multiplexing discussed hereinbefore to provide two levels of multiplexing. Accordingly for a thin grating, the number of bits can be multiplexed based on the number of grating pitches Λ and/or geometrically by the orientation of the grating pitches.

Furthermore, if the input light angle θi is normal to the substrate 10, the edges of the substrate 10 no longer scatter light from the incident angle into the "code angular space", as discussed herein and/or in the aforementioned patent application.

Also, in the thin grating geometry, a continuous broadband wavelength source may be used as the optical source if desired.

Referring to FIG. 37, instead of or in addition to the pitches Λ in the grating 12 being oriented normal to the longitudinal axis, the pitches may be created at a angle θg. In that case, when the input light 24 is incident normal to the surface 792, will produce a reflected output beam 790 having an angle θo determined by Eq. 1 as adjusted for the blaze angle θg. This can provide another level of multiplexing bits in the code.

Figure 38:
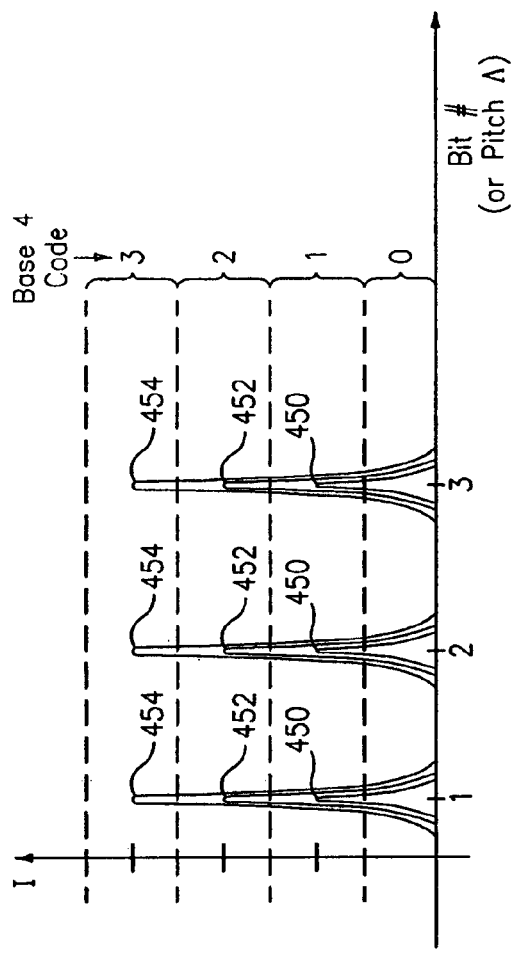
FIG. 38 is a graph of a plurality of states for each bit in a code for an optical identification element, in accordance with the present invention.

Referring to FIG. 38, instead of using an optical binary (0-1) code, an additional level of multiplexing may be provided by having the optical code use other numerical bases, if intensity levels of each bit are used to indicate code information. This could be achieved by having a corresponding magnitude (or strength) of the refractive index change (δn) for each grating pitch Λ. Four intensity ranges are shown for each bit number or pitch Λ, providing for a Base-4 code (where each bit corresponds to 0,1,2, or 3). The lowest intensity level, corresponding to a 0, would exist when this pitch Λ is not present in the grating 12. The next intensity level 450 would occur when a first low level δn1 exists in the grating that provides an output signal within the intensity range corresponding to a 1. The next intensity level 452 would occur when a second higher level δn2 exists in the grating 12 that provides an output signal within the intensity range corresponding to a 2. The next intensity level 454 would occur when a third higher level δn3 exists in the grating 12 that provides an output signal within the intensity range corresponding to a 3.

Figure 39:
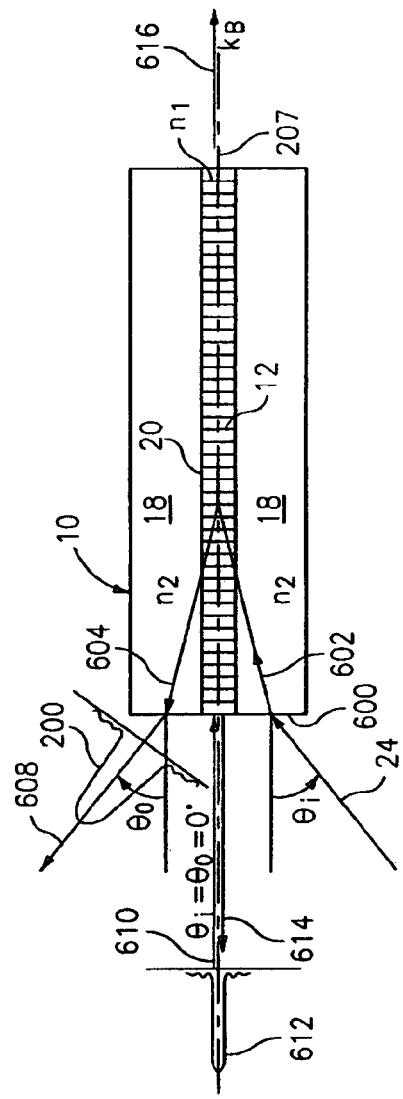
FIG. 39 is a side view of an optical identification element where light is incident on an end face, in accordance with the present invention.

Referring to FIG. 39, the input light 24 may be incident on the substrate 10 on an end face 600 of the substrate 10. In that case, the input light 24 will be incident on the grating 12 having a more significant component of the light (as compared to side illumination discussed hereinbefore) along the longitudinal grating axis 207 of the grating (along the grating vector k$_B$), as shown by a line 602. The light 602 reflects off the grating 12 as indicated by a line 604 and exits the substrate as output light 608. Accordingly it should be understood by one skilled in the art that the diffraction equations discussed hereinbefore regarding output diffraction angle θo also apply in this case except that the reference axis would now be the grating axis 207. Thus, in this case, the input and output light angles θi,θo, would be measured from the grating axis 207 and length Lg of the grating 12 would become the thickness or depth D of the grating 12. As a result, a grating 12 that is 400 microns long, would result in the Bragg envelope 200 being narrow. It should be understood that because the values of n1 and n2 are close to the same value, the slight angle changes of the light between the regions 18,20 are not shown herein.

In the case where incident light 610 is incident along the same direction as the grating vector (Kb) 207, i.e., θi=0 degrees, the incident light sees the whole length Lg of the grating 12 and the grating provides a reflected output light angle θo=0 degrees, and the Bragg envelope 612 becomes extremely narrow, as the narrowing effect discussed above reaches a limit. In that case, the relationship between a given pitch Λ in the grating 12 and the wavelength of reflection λ is governed by a known "Bragg grating" relation:

$$\lambda = 2n_{eff}\Lambda \qquad \text{Eq. 8}$$

where n$_{eff}$ is the effective index of refraction of the substrate, λ is the input (and output wavelength) and Λ is the pitch. This relation, as is known, may be derived from Eq. 1 where θi=θo=90 degrees.

In that case, the code information is readable only in the spectral wavelength of the reflected beam, similar to that discussed hereinbefore for wavelength based code reading. Accordingly the input signal in this case may be a scanned wavelength source or a broadband wavelength source. In addition, as discussed hereinbefore for wavelength based code reading, the code information may be obtained in reflection from the reflected beam 614 or in transmission by the transmitted beam 616 that passes through the grating 12.

It should be understood that for shapes of the substrate 10 or element 8 other than a cylinder, the effect of various different shapes on the propagation of input light through the element 8, substrate 10, and/or grating 12, and the associated reflection angles, can be determined using known optical physics including Snell's Law, shown below:

$$n_{in} \sin \theta in = n_{out} \sin \theta out \qquad 9$$

where n$_{in}$ is the refractive index of the first (input) medium, and n$_{out}$ is the refractive index of the second (output) medium, and θin and θout are measured from a line 620 normal to an incident surface 622.

Figures 40, 41:
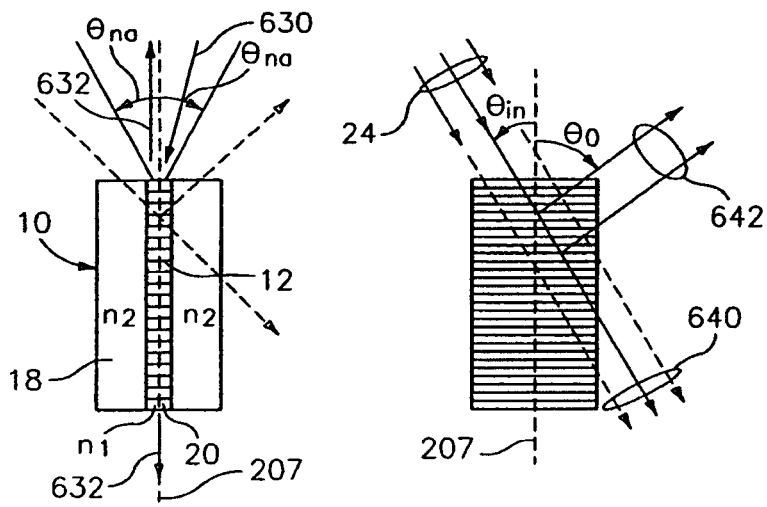
FIGS. 40-41 are side views of an optical identification element where light is incident on an end face, in accordance with the present invention.

Referring to FIG. 40, if the value of n1 in the grating region 20 is greater than the value of n2 in the non-grating region 18, the grating region 20 of the substrate 10 will act as a known optical waveguide for certain wavelengths. In that case, the grating region 20 acts as a "core" along which light is guided and the outer region 18 acts as a "cladding" which helps confine or guide the light. Also, such a waveguide will have a known "numerical aperture" (θna) that will allow light 630 that is within the aperture θna to be directed or guided along the grating axis 207 and reflected axially off the grating 12 and returned and guided along the waveguide. In that case, the grating 12 will reflect light having the appropriate wavelengths equal to the pitches Λ present in the grating 12 back along the region 20 (or core) of the waveguide, and pass the remaining wavelengths of light as the light 632. Thus, having the grating region 20 act as an optical waveguide for wavelengths reflected by the grating 12 allows incident light that is not aligned exactly with the grating axis 207 to be guided along and aligned with the grating 12 axis 207 for optimal grating reflection.

If an optical waveguide is used any standard waveguide may be used, e.g., a standard telecommunication single mode optical fiber (125 micron diameter or 80 micron diameter fiber with about a 8-10 micron diameter), or a larger diameter waveguide (greater than 0.5 mm diameter), such as is describe in U.S. patent application Ser. No. 09/455,868, filed Dec. 6, 1999, entitled "Large Diameter Waveguide, Grating". Further, any type of optical waveguide may be used for the optical substrate 10, such as, a multi-mode, birefringent, polarization maintaining, polarizing, multi-core, multi-cladding, or microstructured optical waveguide, or a flat or planar waveguide (where the waveguide is rectangular shaped), or other waveguides.

Referring to FIG. 41 if the grating 12 extends across the entire dimension D of the substrate, the substrate 10 does not behave as a waveguide for the incident or reflected light and the incident light 24 will be diffracted (or reflected) as indicated by lines 642, and the codes detected as discussed hereinbefore for the end-incidence condition discussed hereinbefore with FIG. 45, and the remaining light 640 passes straight through.

Figure 42:
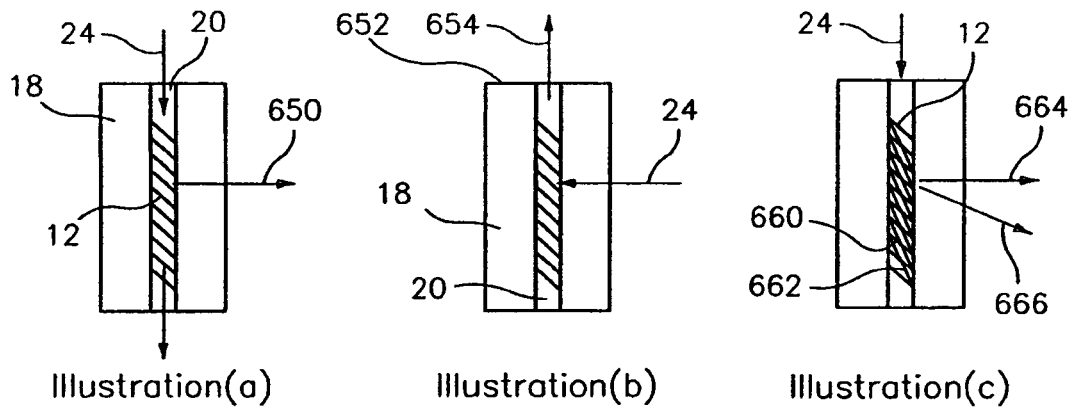
FIG. 42, illustrations (a)-(c) are side views of an optical identification element having a blazed grating, in accordance with the present invention.

Referring to FIG. 42, illustrations (a)-(c), in illustration (a), for the end illumination condition, if a blazed or angled grating is used, as discussed hereinbefore, the input light 24 is coupled out of the substrate 10 at a known angle as shown by a line 650. Referring to FIG. 42, illustration (b), alternatively, the input light 24 may be incident from the side and, if the grating 12 has the appropriate blaze angle, the reflected light will exit from the end face 652 as indicated by a line 654. Referring to FIG. 42, illustration (c), the grating 12 may have a plurality of different pitch angles 660,662, which reflect the input light 24 to different output angles as indicated by lines 664, 666. This provides another level of multiplexing (spatially) additional codes, if desired.

The grating 12 may be impressed in the substrate 10 by any technique for writing, impressed, embedded, imprinted, or otherwise forming a diffraction grating in the volume of or on a surface of a substrate 10. Examples of some known techniques are described in U.S. Pat. Nos. 4,725,110 and 4,807, 950, entitled "Method for Impressing Gratings Within Fiber Optics", to Glenn et al, and U.S. Pat. No. 5,388,173, entitled "Method and Apparatus for Forming Aperiodic Gratings in Optical Fibers", to Glenn, respectively, and U.S. Pat. No. 5,367,588, entitled "Method of Fabricating Bragg Gratings Using a Silica Glass Phase Grating Mask and Mask Used by Same", to Hill, and U.S. Pat. No. 3,916,182, entitled "Periodic Dielectric Waveguide Filter", Dabby et al, and U.S. Pat. No. 3,891,302, entitled "Method of Filtering Modes in Optical Waveguides", to Dabby et al, which are all incorporated herein by reference to the extent necessary to understand the present invention.

Alternatively, instead of the grating 12 being impressed within the substrate material, the grating 12 may be partially or totally created by etching or otherwise altering the outer surface geometry of the substrate to create a corrugated or carving surface geometry of the substrate, such as is described in U.S. Pat. No. 3,891,302, entitled "Method of Filtering Modes in Optical Waveguides", to Dabby et al, which is incorporated herein by reference to the extent necessary to understand the present invention, provided the resultant optical refractive profile for the desired code is created.

Further, alternatively, the grating 12 may be made by depositing dielectric layers onto the substrate, similar to the way a known thin film filter is created, so as to create the desired resultant optical refractive profile for the desired code.

The substrate 10 (and/or the element 8) may have end-view cross-sectional shapes other than circular, such as square, rectangular, elliptical, clam-shell, D-shaped, or other shapes, and may have side-view sectional shapes other than rectangular, such as circular, square, elliptical, clam-shell, D-shaped, or other shapes. Also, 3D geometries other than a cylinder may be used, such as a sphere, a cube, a pyramid or any other 3D shape. Alternatively, the substrate 10 may have a geometry that is a combination of one or more of the foregoing shapes.

The shape of the element 8 and the size of the incident beam may be made to minimize any end scatter off the end face(s) of the element 8, as is discussed herein and/or in the aforementioned patent application. Accordingly to minimize such scatter, the incident beam 24 may be oval shaped where the narrow portion of the oval is smaller than the diameter D1, and the long portion of the oval is smaller than the length L of the element 8. Alternatively, the shape of the end faces may be rounded or other shapes or may be coated with an antireflective coating.

It should be understood that the size of any given dimension for the region 20 of the grating 12 may be less than any corresponding dimension of the substrate 10. For example, if the grating 12 has dimensions of length Lg, depth Dg, and width Wg, and the substrate 12 has different dimensions of length L, depth D, and width W, the dimensions of the grating 12 may be less than that of the substrate 12. Thus, the grating 12, may be embedded within or part of a much larger substrate 12. Also, the element 8 may be embedded or formed in or on a larger object for identification of the object.

The dimensions, geometries, materials, and material properties of the substrate 10 are selected such that the desired optical and material properties are met for a given application. The resolution and range for the optical codes are scalable by controlling these parameters as discussed herein and/or in the aforementioned patent application.

Referring to FIG. 43, the substrate 10 may have an outer coating 799, such as a polymer or other material that may be dissimilar to the material of the substrate 10, provided that the coating 799 on at least a portion of the substrate, allows sufficient light to pass through the substrate for adequate optical detection of the code. The coating 799 may be on any one or more sides of the substrate 10. Also, the coating 799 may be a material that causes the element 8 to float or sink in certain fluids (liquid and/or gas) solutions.

Also, the substrate 10 may be made of a material that is less dense than certain fluid (liquids and/or gas) solutions, thereby allowing the elements 8 to float or be buoyant or partially buoyant. Also, the substrate may be made of a porous material, such as controlled pore glass (CPG) or other porous material, which may also reduce the density of the element 8 and may make the element 8 buoyant or partially-buoyant in certain fluids.

Figure 44:
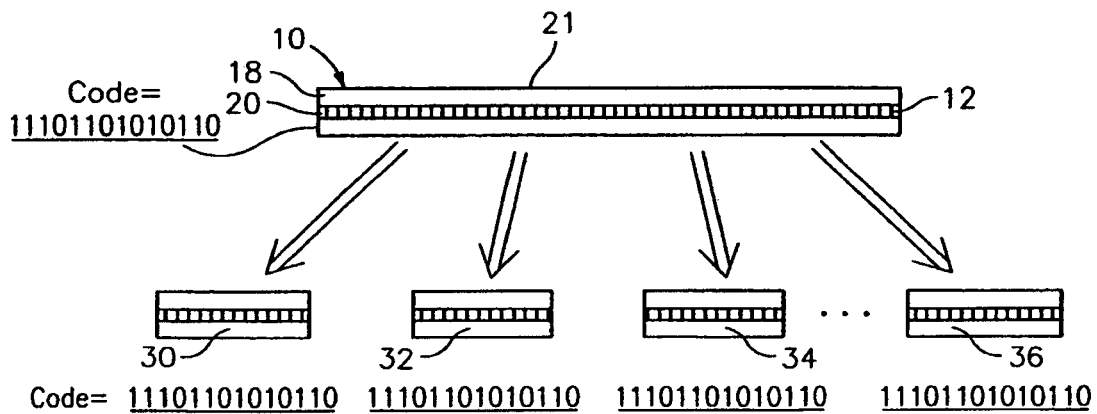
FIG. 44 is a side view of whole and partitioned optical identification element, in accordance with the present invention.

Referring to FIG. 44, the grating 12 is axially spatially invariant. As a result, the substrate 10 with the grating 12 (shown as a long substrate 21) may be axially subdivided or cut into many separate smaller substrates 30-36 and each substrate 30-36 will contain the same code as the longer substrate 21 had before it was cut. The limit on the size of the smaller substrates 30-36 is based on design and performance factors discussed herein and/or in the aforementioned patent application.

Referring to FIG. 45, one purpose of the outer region 18 (or region without the grating 12) of the substrate 10 is to provide mechanical or structural support for the inner grating region 20. Accordingly the entire substrate 10 may comprise the grating 12, if desired. Alternatively, the support portion may be completely or partially beneath, above, or along one or more sides of the grating region 20, such as in a planar geometry, or a D-shaped geometry, or other geometries, as described herein and/or in the aforementioned patent application. The non-grating portion 18 of the substrate 10 may be used for other purposes as well, such as optical lensing effects or other effects (discussed herein or in the aforementioned patent application). Also, the end faces of the substrate 10 need not be perpendicular to the sides or parallel to each other. However, for applications where the elements 8 are stacked end-to-end, the packing density may be optimized if the end faces are perpendicular to the sides.

Referring to FIG. 46, illustrations (a)-(c), two or more substrates 10,250, each having at least one grating therein, may be attached together to form the element 8, e.g., by an adhesive, fusing or other attachment techniques. In that case, the gratings 12,252 may have the same or different codes.

Referring to FIG. 47, illustrations (a) and (b), the substrate 10 may have multiple regions 80,90 and one or more of these regions may have gratings in them. For example, there may be gratings 12,252 side-by-side (illustration (a)), or there may be gratings 82-88, spaced end-to-end (illustration (b)) in the substrate 10.

Referring to FIG. 48, the length L of the element 8 may be shorter than its diameter D, thus, having a geometry such as a plug, puck, wafer, disc or plate.

Referring to FIG. 49, to facilitate proper alignment of the grating axis with the angle θi of the input beam 24, the substrate 10 may have a plurality of the gratings 12 having the same codes written therein at numerous different angular or rotational (or azimuthal) positions of the substrate 10. In particular, two gratings 550, 552, having axial grating axes 551, 553, respectively may have a common central (or pivot or rotational) point where the two axes 551,553 intersect. The angle θi of the incident light 24 is aligned properly with the grating 550 and is not aligned with the grating 552, such that output light 555 is reflected off the grating 550 and light 557 passes through the grating 550 as discussed herein. If the element 8 is rotated as shown by the arrows 559, the angle θi of incident light 24 will become aligned properly with the grating 552 and not aligned with the grating 550 such that output light 555 is reflected off the grating 552 and light 557 passes through the grating 552. When multiple gratings are located in this rotational orientation, the bead may be rotated as indicated by a line 559 and there may be many angular positions that will provide correct (or optimal) incident input angles θi to the grating. While this example shows a circular cross-section, this technique may be used with any shape cross-section.

Referring to FIG. 50, illustrations (a), (b), (c), (d), and (e) the substrate 10 may have one or more holes located within the substrate 10. In illustration (a), holes 560 may be located at various points along all or a portion of the length of the substrate 10. The holes need not pass all the way through the substrate 10. Any number, size and spacing for the holes 560 may be used if desired. In illustration (b), holes 572 may be located very close together to form a honeycomb-like area of all or a portion of the cross-section. In illustration (c), one (or more) inner hole 566 may be located in the center of the substrate 10 or anywhere inside of where the grating region(s) 20 are located. The inner hole 566 may be coated with a reflective coating 573 to reflect light to facilitate reading of one or more of the gratings 12 and/or to reflect light diffracted off one or more of the gratings 12. The incident light 24 may reflect off the grating 12 in the region 20 and then reflect off the surface 573 to provide output light 577. Alternatively, the incident light 24 may reflect off the surface 573, then reflect off the grating 12 and provide the output light 575. In that case the grating region 20 may run axially or circumferentially 571 around the substrate 10. In illustration (d), the holes 579 may be located circumferentially around the grating region 20 or transversely across the substrate 10. In illustration (e), the grating 12 may be located circumferentially around the outside of the substrate 10, and there may be holes 574 inside the substrate 10. In that case, the incident light 24 reflects off the grating 12 to provide the optical light 576.

Referring to FIG. 51, illustrations (a), (b), and (c), the substrate 10 may have one or more protruding portions or teeth 570, 578,580 extending radially and/or circumferentially from the substrate 10. Alternatively, the teeth 570, 578, 580 may have any other desired shape.

Referring to FIG. 52, illustrations (a), (b), (c) a D-shaped substrate, a flat-sided substrate and an eye-shaped (or clam-shell or teardrop shaped) substrate 10, respectively, are shown. Also, the grating region 20 may have end cross-sectional shapes other than circular and may have side cross-sectional shapes other than rectangular, such as any of the geometries described herein for the substrate 10. For example, the grating region 20 may have an oval cross-sectional shape as shown by dashed lines 581, which may be oriented in a desired direction, consistent with the teachings herein. Any other geometries for the substrate 10 or the grating region 20 may be used if desired, as described herein.

Referring to FIG. 53, at least a portion of a side of the substrate 10 may be coated with a reflective coating 514 to allows incident light 510 to be reflected back to the same side from which the incident light came, as indicated by reflected light 512.

Referring to FIG. 54, illustrations (a) and (b), alternatively, the substrate 10 can be electrically and/or magnetically polarized, by a dopant or coating, which may be used to ease handling and/or alignment or orientation of the substrate 10 and/or the grating 12, or used for other purposes. Alternatively, the bead may be coated with conductive material, e.g., metal coating on the inside of a holey substrate, or metallic dopant inside the substrate. In these cases, such materials can cause the substrate 10 to align in an electric or magnetic field. Alternatively, the substrate can be doped with an element or compound that fluoresces or glows under appropriate illumination, e.g., a rare earth dopant, such as Erbium, or other rare earth dopant or fluorescent or luminescent molecule. In that case, such fluorescence or luminescence may aid in locating and/or aligning substrates.

The dimensions and/or geometries for any of the embodiments described herein are merely for illustrative purposes and, as such, any other dimensions and/or geometries may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A system for writing an optical code within or on a fiber substrate, the system comprising:
   a holding device having a plurality of supports spaced apart from each other, the fiber substrate being wound about the supports such that the fiber substrate forms at least one flat section extending between adjacent supports, wherein the fiber substrate is configured to be wound about the supports a plurality of times to form a fiber ribbon; and at least one light source configured to write an optical code within or on the flat section of the fiber substrate.

2. A system in accordance with claim 1 wherein the holding device includes a plurality of openings, each opening formed between adjacent supports.

3. A system in accordance with claim 1 wherein the holding device includes a plate, the supports extending from the plate and parallel with respect to each other.

4. A system in accordance with claim 1 wherein the holding device has a generally polygonal shape.

5. A system in accordance with claim 1 wherein the holding device includes a disk, the fiber substrate being wound about an outer circumference of the disk.

6. A system in accordance with claim 5 wherein the disk includes a plurality of circumferentially spaced slots, the fiber substrate extending across each slot.

7. A system in accordance with claim 1 wherein the holding device is configured to rotate about an axis, the supports extending parallel to the axis and rotating about the axis.

8. A system in accordance with claim 1 wherein the fiber substrate forms a generally polygonal shape when the fiber substrate is wound about the holding device.

9. A system in accordance with claim 1 wherein the plurality of supports include a plurality of rods.

10. A system in accordance with claim 1 further comprising a phase mask configured such that light from the light source passes through the phase mask to write the optical code.

11. A system in accordance with claim 1 wherein the light source is configured to write a diffraction grating within the fiber substrate.

12. A system in accordance with claim 1 wherein the light source comprises only a single laser or a pair of lasers.

13. A system in accordance with claim 1 further comprising the fiber substrate.

14. A system in accordance with claim 1 wherein the holding device is moveable relative to the light source, the supports and the fiber substrate being configured to have a fixed position with respect to each other when the holding device is moved.

15. A method for writing an optical code within or on a fiber substrate, the method comprising:
  providing a holding device, the holding device having a plurality of supports spaced apart from each other;
  winding the fiber substrate about the holding device, the fiber substrate being wound about the supports such that the fiber substrate forms at least one flat section extending between adjacent supports, wherein the fiber substrate forms a generally polygonal shape having a plurality of flat sections when the fiber substrate is wound about the holding device; and
  providing a light beam to the flat sections of the fiber substrate to write optical codes within or on the fiber substrate.

16. A method in accordance with claim 15 wherein the holding device is configured to be rotated about an axis to position the flat sections for writing.

17. A method in accordance with claim 15 wherein each of the flat sections is written with a different code.

18. A method in accordance with claim 15 wherein the adjacent supports includes pairs of adjacent supports, the fiber substrate being wound a plurality of times about the holding device such that each pair of adjacent supports has a plurality of flat sections extending therebetween.

19. A method in accordance with claim 15 wherein said winding the fiber substrate includes winding the fiber substrate a plurality of times about the holding device to form a plurality of wraps, each wrap of the fiber substrate being adjacent to other wraps of the fiber substrate.

20. A method in accordance with claim 15 wherein the light beam is split to provide interfering beams or the light beam is passed through a phase mask.

21. A method in accordance with claim 15 further comprising:
  moving the holding device relative to a light source that provides the light beam, wherein the supports and the fiber substrate have a fixed position with respect to each other when the holding device is moved.

22. A method for writing an optical code within or on a fiber substrate, the method comprising:
  providing a holding device, the holding device having a plurality of supports spaced apart from each other;
  winding the fiber substrate about the holding device, the fiber substrate being wound about the supports such that the fiber substrate forms at least one flat section extending between adjacent supports, the fiber substrate being wound a plurality of times about the supports; and
  providing a light beam to the flat section of the fiber substrate to write an optical code within or on the fiber substrate.

23. A method in accordance with claim 22 wherein the holding device is configured to be rotated about an axis.

24. A method in accordance with claim 22 wherein the fiber substrate forms a generally polygonal shape having a plurality of flat sections when the fiber substrate is wound about the holding device.

25. A method in accordance with claim 24 wherein the light beam is provided to the flat sections to write optical codes within or on the fiber substrate.

26. A method in accordance with claim 24 wherein each of the flat sections is written with a different code.

27. A method in accordance with claim 22 further comprising providing a phase mask, the light beam passing through the phase mask to form the optical code.

28. A method in accordance with claim 22 wherein the fiber substrate has a plurality of wraps about the supports, each wrap of the fiber substrate being adjacent to other wraps of the fiber substrate.

29. A method in accordance with claim 22 further comprising:
  moving the holding device relative to a light source that provides the light beam, wherein the supports and the fiber substrate have a fixed position with respect to each other when the holding device is moved.

30. A method in accordance with claim 22 wherein the light beam is split to provide interfering beams or the light beam is passed through a phase mask.

31. A system for writing an optical code within or on a fiber substrate, the system comprising:
  a holding device having a plurality of supports spaced apart from each other, the supports being arranged so that the fiber substrate forms a generally polygonal shape when wound about the supports and has a plurality of flat sections that extend between adjacent supports; and
  at least one light source configured to write optical codes within or on the flat sections of the fiber substrate.

32. A system in accordance with claim 31 wherein the holding device is moveable relative to the light source, the supports and the fiber substrate being configured to have a fixed position with respect to each other when the holding device is moved.

33. A system in accordance with claim 31 wherein the holding device includes a plate, the supports extending from the plate and parallel with respect to each other.

34. A system in accordance with claim 31 wherein the holding device includes a disk, the fiber substrate being wound about an outer circumference of the disk.

35. A system in accordance with claim 31 wherein the holding device is configured to rotate about an axis, the supports extending parallel to the axis and rotating about the axis.

36. A system in accordance with claim 31 wherein the plurality of supports include a plurality of rods.

37. A system in accordance with claim 31 further comprising a phase mask positioned so that light from the light source passes through the phase mask to write the optical code.

38. A system in accordance with claim 31 further comprising the fiber substrate.

* * * * *

UNITED STATES PATENT AND TRADEMARK OFFICE
CERTIFICATE OF CORRECTION

PATENT NO. : 7,898,735 B2
APPLICATION NO. : 12/053242
DATED : March 1, 2011
INVENTOR(S) : John A. Moon Page 1 of 1

It is certified that error appears in the above-identified patent and that said Letters Patent is hereby corrected as shown below:

Title Page, Item (63) is deleted on the cover page and replaced with the following:

--(63) Continuation of application no. 11/454,307, filed on Jun. 16, 2006, which is a continuation of application no. 10/661,116, filed on Sep. 12, 2003, now patent no. 7,092,160, which is a continuation-in-part of application no. 10/645,689, filed on Aug. 20, 2003.--

Section (60) is inserted below Section (63):

--(60) Provisional application no. 60/410,541, filed on Sep. 12, 2002.--

Signed and Sealed this
Nineteenth Day of July, 2011

David J. Kappos
*Director of the United States Patent and Trademark Office*